(12) United States Patent
Hanneken

(10) Patent No.: US 11,272,807 B2
(45) Date of Patent: Mar. 15, 2022

(54) WARMING APPARATUS INCLUDING A HEATING ELEMENT

(71) Applicant: Handi-Craft Company, St. Louis, MO (US)

(72) Inventor: Douglas Hanneken, Saint Louis, MO (US)

(73) Assignee: HANDI-CRAFT COMPANY, St. Louis, MO (US)

( * ) Notice: Subject to any disclaimer, the term of this patent is extended or adjusted under 35 U.S.C. 154(b) by 494 days.

(21) Appl. No.: 16/262,137

(22) Filed: Jan. 30, 2019

(65) Prior Publication Data

US 2019/0231122 A1    Aug. 1, 2019

Related U.S. Application Data

(60) Provisional application No. 62/624,421, filed on Jan. 31, 2018.

(51) Int. Cl.
*A47J 36/24* (2006.01)

(52) U.S. Cl.
CPC ....... *A47J 36/2438* (2013.01); *A47J 36/2483* (2013.01); *A47J 36/2411* (2013.01)

(58) Field of Classification Search
None
See application file for complete search history.

(56) References Cited

U.S. PATENT DOCUMENTS

| 3,585,362 | A | * | 6/1971 | Hoogesteger ....... | A47J 36/2433 219/437 |
| 3,892,945 | A | * | 7/1975 | Lerner ................ | A47J 36/2433 219/437 |
| 4,597,435 | A | * | 7/1986 | Fosco, Jr. ........... | A47J 36/2411 126/261 |
| 5,671,325 | A | | 9/1997 | Roberson | |
| 5,975,337 | A | | 11/1999 | Hadley | |
| D448,236 | S | | 9/2001 | Murray | |
| 6,571,564 | B2 | | 6/2003 | Upadhye et al. | |
| 6,809,302 | B1 | | 10/2004 | Jones et al. | |

(Continued)

FOREIGN PATENT DOCUMENTS

| EP | 180375 A1 | 5/1986 |
| WO | 03039310 A1 | 5/2003 |

(Continued)

OTHER PUBLICATIONS

ISR/WO PCT/US2019/015808 filed Jan. 30, 2019 Handi-Craft Company, mailed May 10, 2019, 36 pages.

*Primary Examiner* — Joseph M. Pelham
(74) *Attorney, Agent, or Firm* — Armstrong Teasdale LLP

(57) ABSTRACT

A warming apparatus for warming contents of a foodstuff container includes an enclosure defining an interior space for receiving the foodstuff container and a reservoir separate from the interior space for receiving a warming liquid. A heating element is disposed within the enclosure for warming the warming liquid within the reservoir. A conduit is configured to extend between the interior space and the reservoir so that the reservoir is in fluid communication with the interior space. The heating element is adapted to move the warming liquid from the reservoir through the conduit into the interior space as the warming liquid within the reservoir is warmed.

20 Claims, 17 Drawing Sheets

(56) References Cited

U.S. PATENT DOCUMENTS

| | | | |
|---|---|---|---|
| 6,861,618 B2 | 3/2005 | Binet et al. | |
| 6,906,289 B2* | 6/2005 | Serres Vives | A47J 36/2438 219/386 |
| 7,002,111 B2* | 2/2006 | Bauer | A47J 36/2438 219/432 |
| 7,287,386 B2 | 10/2007 | Upadhye et al. | |
| D638,653 S | 5/2011 | Borin | |
| D641,197 S | 7/2011 | Borin | |
| 8,045,848 B2 | 10/2011 | Wortley | |
| 8,131,137 B1 | 3/2012 | Cowles | |
| 8,742,297 B2 | 6/2014 | Zakowski et al. | |
| 8,759,722 B2 | 6/2014 | Bolbanat | |
| 8,796,591 B2 | 8/2014 | Schwartz | |
| 8,866,050 B2* | 10/2014 | McBean | A47J 36/2438 219/430 |
| 8,960,992 B2 | 2/2015 | Jong et al. | |
| 9,364,806 B2 | 6/2016 | King | |
| 10,750,902 B2* | 8/2020 | Hanneken | A47J 36/2438 |
| 2003/0074903 A1* | 4/2003 | Upadhye | F25D 31/005 62/3.3 |
| 2004/0074395 A1* | 4/2004 | Serres Vives | A47J 36/2438 99/275 |
| 2007/0289977 A1* | 12/2007 | Zhuang | A47J 36/2438 220/592.16 |
| 2014/0069606 A1 | 3/2014 | Lee | |
| 2014/0332520 A1 | 11/2014 | Kooijker et al. | |
| 2016/0015209 A1 | 1/2016 | Dunn et al. | |
| 2016/0242598 A1 | 8/2016 | Alexander | |
| 2017/0086620 A1 | 3/2017 | Duineveld et al. | |
| 2018/0020871 A1 | 1/2018 | Van Wieringen et al. | |
| 2018/0192819 A1* | 7/2018 | Hanneken | A47J 36/2438 |
| 2018/0263403 A1* | 9/2018 | Richardson | A23F 5/26 |
| 2019/0191913 A1* | 6/2019 | Richardson | A47J 31/0576 |

FOREIGN PATENT DOCUMENTS

| | | |
|---|---|---|
| WO | 2015091114 A1 | 6/2015 |
| WO | 2016146390 A1 | 9/2016 |
| WO | 2018128852 A1 | 7/2018 |

* cited by examiner

WARMING APPARATUS INCLUDING A HEATING ELEMENT

CROSS REFERENCE TO RELATED APPLICATIONS

This application claims the benefit of U.S. Provisional Patent Application No. 62/624,421 filed Jan. 31, 2018, which is hereby incorporated by reference in its entirety.

FIELD

The field of the disclosure relates generally to warming apparatus for warming the contents of a foodstuff container, and more particularly to warming apparatus for warming the contents of containers, such as bottles, jars, flexible bags and the like, used for containing baby foodstuffs such as breastmilk, nursing formula or baby food.

BACKGROUND

Containers for baby foodstuffs such as breastmilk, nursing formula, other liquid foodstuffs or baby foods come in various materials, sizes and shapes. For example, breastmilk and nursing formula containers are typically in the form of what is commonly referred to as a baby bottle which may be made of a relatively rigid plastic or glass. However, flexible plastic pouches or bags that can be used for freezer storage of breastmilk and nursing formula may also be used as containers for baby foodstuffs. Of course, baby foods (e.g., semi-solids, pastes, gels, purees, solids, etc.) that are typically served using a spoon are often contained in jars but may also be contained in flexible tubes or other squeeze-type dispensing containers.

Conventional warming apparatus typically include a housing having a warming compartment into which the container (with the foodstuff therein) is placed for warming. In one type of warming apparatus, referred to as a bath-type warming apparatus, the warming compartment is filled with a warming liquid such as water. The foodstuff container, upon placement in the warming compartment is partially immersed in the warming liquid. The warming liquid is then heated to heat the foodstuff within the container. In other known warming apparatus, such as that disclosed in U.S. Pat. No. 6,906,289 issued Jun. 14, 2005 and entitled Apparatus for Heating a Vessel Containing Foodstuffs, heated warming liquid is directed to an upper end of the warming compartment and dispensed onto the foodstuff container so that the heated liquid flows down over the container within the warming compartment. The warming then drains down into a reservoir below the warming compartment for reheating and delivery back to the upper end of the warming compartment.

In another known warming apparatus, disclosed in U.S. Pat. No. 8,866,050 issued Oct. 21, 2014 and entitled Baby Bottle Warmer and Method of Using Same, heated warming liquid is pumped into the warming compartment by an electric pump at the lower end of the warming compartment to fill the warming compartment with heated warming liquid. When warming of the foodstuff in the container is completed (e.g., to a desired temperature), the warming liquid drains out of the warming compartment through drain holes positioned within the lower end of the warming compartment and into the reservoir so that the foodstuff container does not remain immersed in heated liquid once the desired foodstuff temperature is reached.

In still other known warming apparatus, steamed warming liquid (e.g., steamed water) is delivered into the warming compartment to warm the foodstuff in the container.

One common drawback to these conventional warming apparatus is that internal piping/liquid passages and reservoirs for circulating and storing warming liquid are often very difficult for users to access. As a result, it is often very difficult for users to access the piping/liquid passages or reservoir to clean any milk or other foodstuff that may have been spilled or leaked from the foodstuff container.

There is a need, therefore, for a warming apparatus that includes an easily accessible warming liquid circulation system (e.g., liquid passages, reservoir) for inspection and cleaning by the end users.

SUMMARY

In one aspect, a warming apparatus for warming contents of a foodstuff container generally comprises an enclosure defining an interior space for receiving the foodstuff container and a reservoir separate from the interior space for receiving a warming liquid. A heating element is disposed within the enclosure for warming the warming liquid within the reservoir. A conduit is configured to extend between the interior space and the reservoir so that the reservoir is in fluid communication with the interior space. The heating element is adapted to move the warming liquid from the reservoir through the conduit into the interior space as the warming liquid within the reservoir is warmed.

In another aspect, a warming apparatus for warming the contents of a foodstuff container generally comprises a first housing and a second housing. The first housing has a peripheral sidewall defining an interior space for receiving the foodstuff container, an open upper end, and a base located opposite the open upper end. The second housing defines a reservoir for receiving a warming liquid. The warming apparatus further comprises a heating element disposed within the second housing, and a conduit configured to extend between the first housing and the second housing so that the reservoir defined by the second housing is in fluid communication with the interior space of the first housing. The heating element is adapted to move the warming liquid from the reservoir defined by the second housing through the conduit into the interior space of the first housing as the warming liquid within the reservoir is warmed.

BRIEF DESCRIPTION OF THE DRAWINGS

These and other features, aspects, and advantages of the present disclosure will become better understood when the following detailed description is read with reference to the accompanying drawings in which corresponding characters represent corresponding parts throughout the several views of the drawings.

DETAILED DESCRIPTION OF THE DRAWINGS

As used herein, the term "container" refers to any container suitable for containing foodstuff. In particular embodiments, the container is suitable for dispensing the foodstuff from the container by pouring, drinking, squeezing, scooping, spooning or other suitable dispensing technique. The container may be, for example and without limitation, a bottle, jar, a can, a flexible pouch or bag, a squeeze tube or other suitable container used to contain foodstuff. The container may be made of substantially any material but is most suitably constructed of a material that allows efficient heat transfer between the foodstuff contained in the container and a warming liquid exterior of the container. For example, and without limitation, glass, plastic, metal or combinations thereof are suitable materials from which the container may be constructed.

The term "foodstuff" as used herein refers to any foodstuff, whether in liquid, semi-solid or solid form. In the illustrated embodiments, the warming apparatus disclosed herein is in the form of a warming apparatus for warming baby foodstuffs such as breastmilk, nursing formula or baby food. In the various embodiments disclosed herein, the container is in the form of a baby bottle B (FIGS. 9-12) used for liquid foodstuffs such as breastmilk or nursing formula. It is contemplated, however, that the warming apparatus disclosed herein can be used to warm foodstuff other than baby foodstuff or containers containing various foodstuffs without departing from some aspects of this disclosure.

Figure 1:
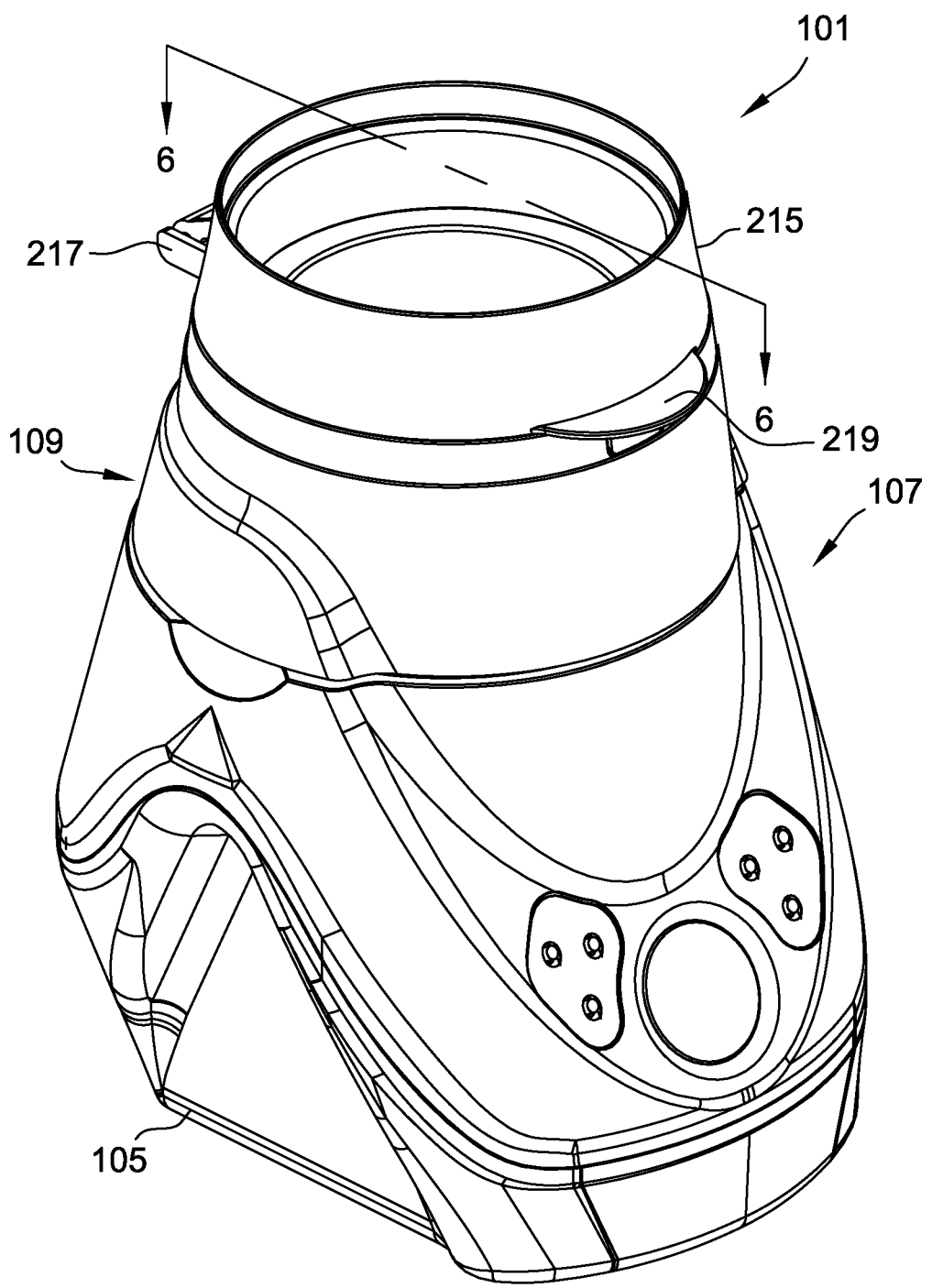
FIG. 1 is a perspective view of one suitable embodiment of a warming apparatus of the present disclosure for warming the contents of a foodstuff container, the warming apparatus having a first housing attached to a second housing.
Figure 2:
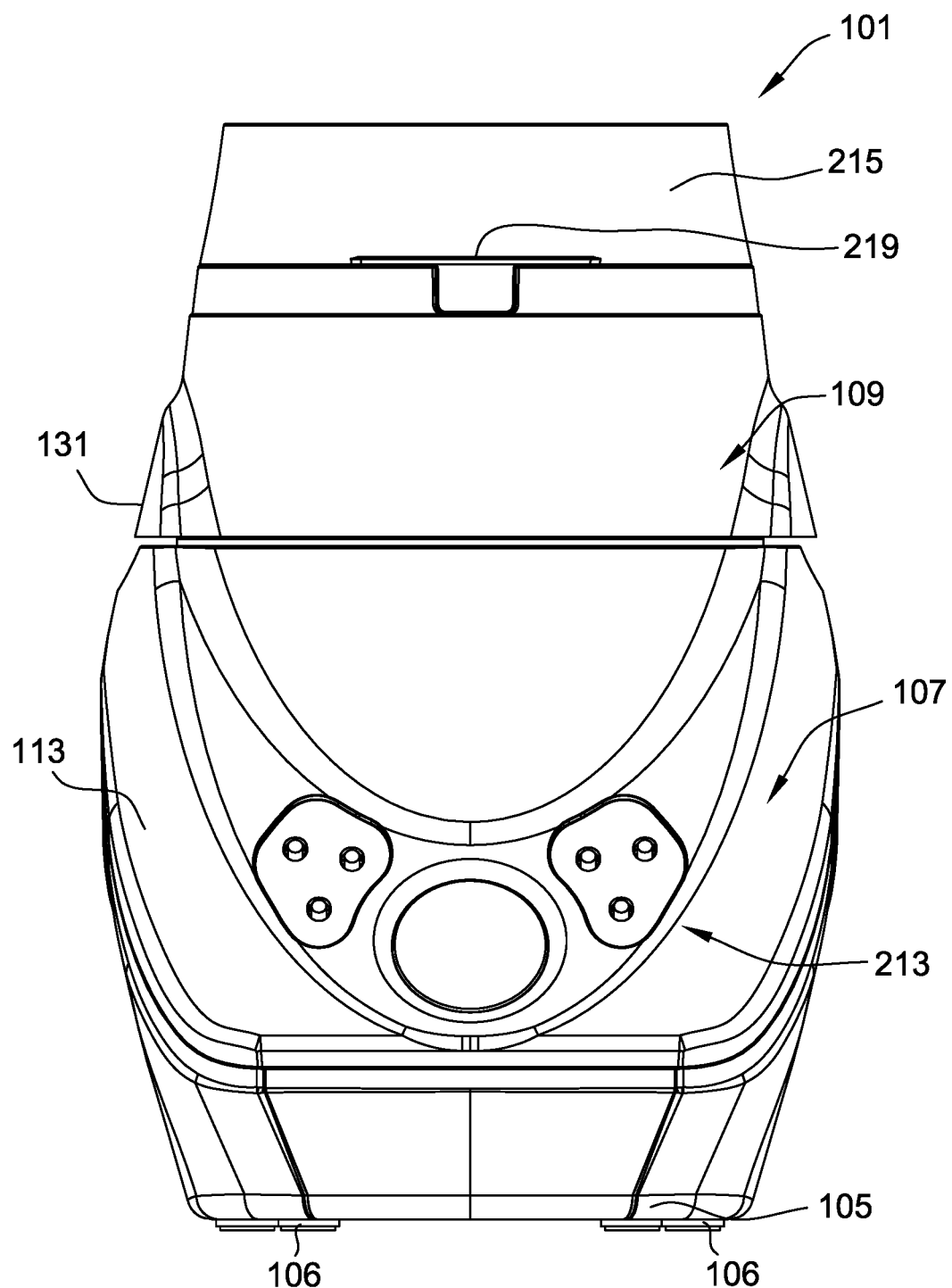
FIG. 2 is a front view of the warming apparatus of FIG. 1.
Figure 3:
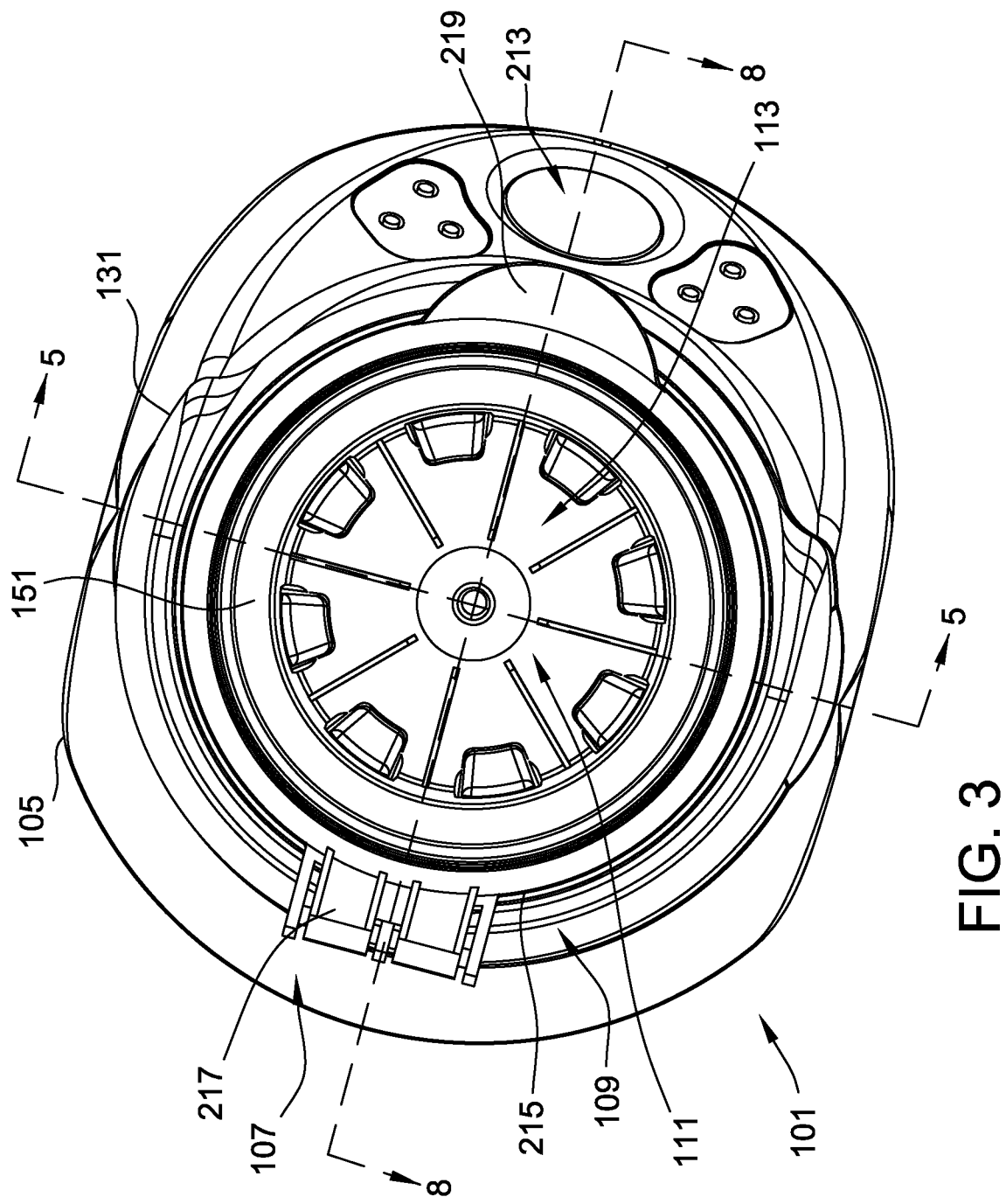
FIG. 3 is a top view of the warming apparatus of FIG. 1.

FIGS. 1-10 illustrate one suitable embodiment of a warming apparatus, generally indicated at 101, for warming the contents of a foodstuff container, e.g., baby bottle B. With particular reference to FIGS. 1-3, the warming apparatus 101 generally comprises a first housing indicated at 109 and a second housing indicated at 107 having a base 105. Particularly, in the illustrated embodiment, the first housing 109 is an upper housing and the second housing 107 is a lower housing. The second housing 107 may be formed integrally with the base 105 or formed separate from the base and attached thereto by adhesive bonding, thermal bonding, mechanical fastening or other suitable attachment techniques. As best seen in FIG. 2, the base 105 includes a plurality of feet 106 for supporting the warming apparatus 101 on a surface.

Figure 4:
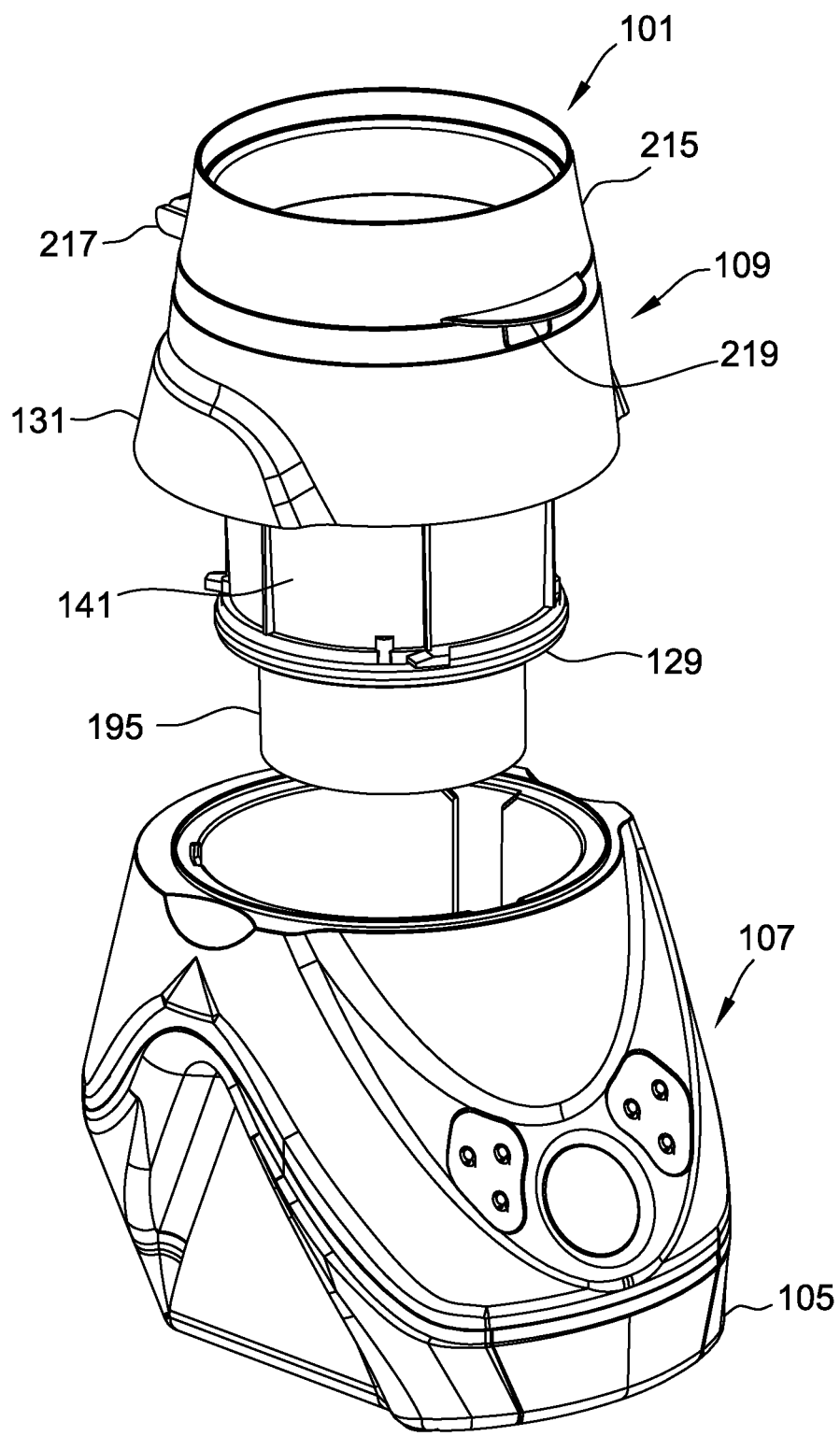
FIG. 4 is a perspective view of the warming apparatus of FIG. 1 with the first housing detached from the second housing.

As best seen in FIG. 4, the first housing 109 can be selectively attachable and detachable to the second housing 107. Thus, the first housing 109 can be selectively manually removed from the second housing 107 by a user, and selectively manually engaged with the second housing by the user. In other suitable embodiments, the first housing 109 may be formed integrally with the second housing 107, or formed separate from the second housing 107 and secured thereto by a suitable attachment technique. It is also contemplated that in other embodiments, the first housing 109 and the second housing 107 may include a single enclosure and remain within the scope of this disclosure.

Figure 5:
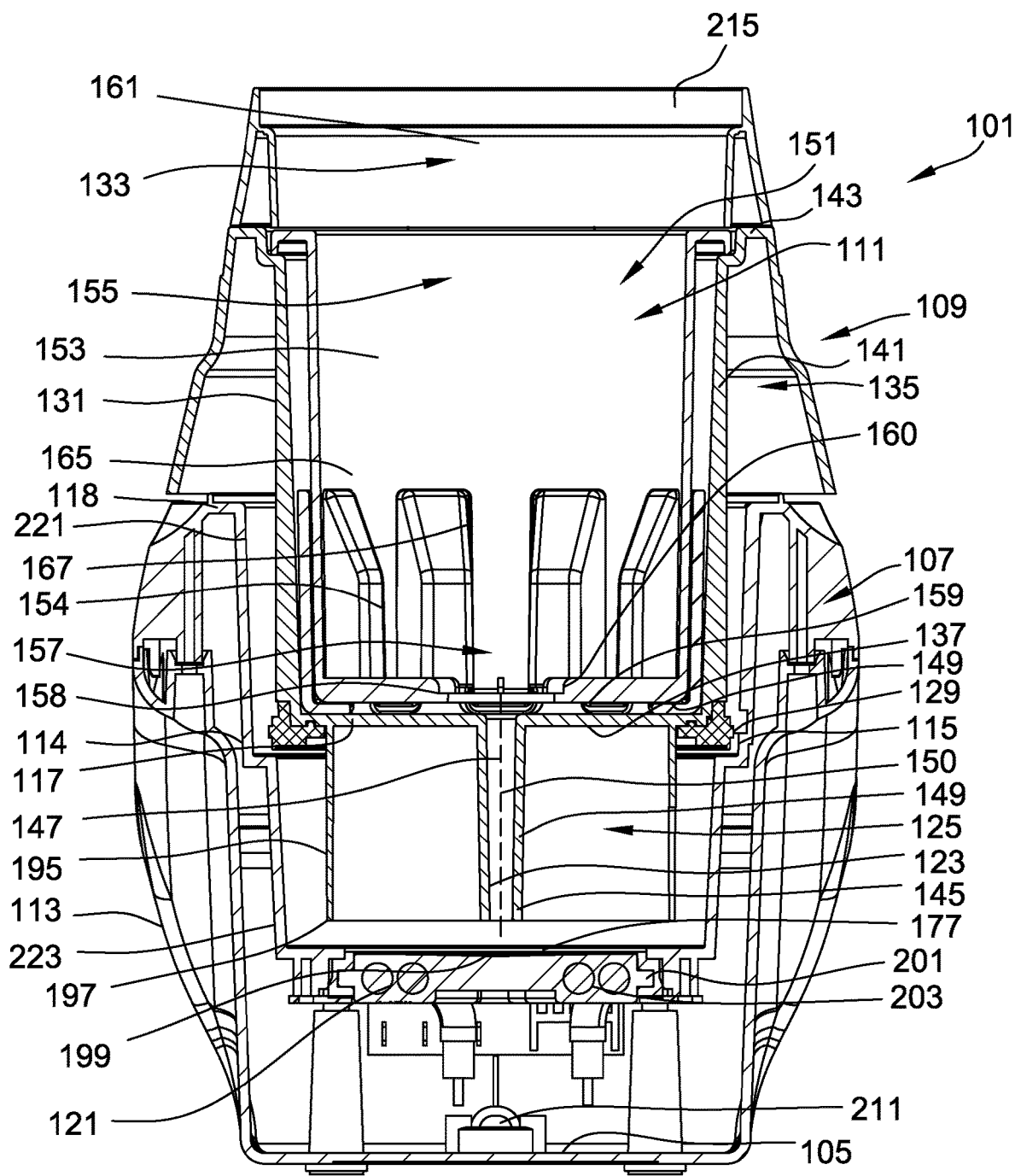
FIG. 5 is a cross-section of the warming apparatus of FIG. 3 taken along the line 5-5.

As illustrated in FIG. 5, the second housing 107 comprises an outer peripheral sidewall 113 extending up from the base 105 and an inner peripheral sidewall 114 transversely spaced from the outer peripheral sidewall 113. In the illustrated embodiment, the inner peripheral sidewall 114 of the second housing 107 includes an upper portion 221, a reservoir sidewall 223, and a coupling surface 115. A ledge 118 is formed integrally with the outer peripheral sidewall 113 at an upper end of the outer peripheral sidewall 113 and extends transversely thereof across the second housing 107 to the upper portion 221 of the inner peripheral sidewall 114 of the second housing. The inner peripheral sidewall 114 is also formed integrally with the ledge 118 and the outer peripheral sidewall 113.

A reservoir 125 is defined within the second housing 107 and is configured to contain a volume of a warming liquid. Specifically, the reservoir 125 is defined by the reservoir sidewall 223 for containing warming liquid to be used in warming the contents of the foodstuff container in the manner described later herein. The reservoir sidewall 223 extends downward a reservoir depth 175 a distance from the coupling surface 115 to a reservoir bottom 177. In the illustrated embodiment, the reservoir 125 is arranged to be filled with a volume of a warming liquid (e.g., water). As best seen in FIG. 4, the reservoir 125 is accessible by a user when the first housing 109 is detached from the second housing 107. As a result, the reservoir 125 may be cleaned by a user simply by selectively detaching the first housing 109 from the second housing 107.

With reference to FIG. 5, a suitable heating element 121 is disposed in the interior space of the second housing 107 and in thermal communication with the reservoir 125. In operation, and as is described in greater detail below, the heating element 121 enables circulation of warming liquid throughout the warming apparatus 101 without the use of a mechanical pump. In other words, in operation, the heating element 121 provides the sole energy source by which warming liquid is circulated. Thus, in the illustrated embodiment, the warming apparatus 101 is free of a mechanical pump.

In the illustrated embodiment, the heating element 121 is suitably a flat plate heating element positioned within the reservoir bottom 177 and transversely spaced a vertical distance from the base 105. As seen in FIG. 5, the heating element 121 comprises a heat plate 199 attached in thermal communication with a thermal source 203. Specifically, the thermal source 203 is an electrical coiled heating element electrically coupled to an external electrical energy source and operable to radiate heat when an electrical current flows therethrough. The heat plate 199 is comprised of a thermally conductive material suitable to translate thermal energy from the thermal source 203 to the warming liquid. It is also understood that in other suitable embodiments, other suitable thermal sources may be used to provide heat to the heat plate 199 and still remain within the scope of this disclosure. For example, in other embodiments, the heat plate 199 may be an induction heating element (not shown).

The heating element 121 is affixed to and sealed with the reservoir bottom 177 via couplers 201. Specifically, the couplers 201 are positioned within the reservoir bottom 177 and coupled to the heat plate 199 and the thermal source 203 such that the thermal source 203 is in thermal communication with the heat plate 199. Additionally, the couplers 201 provide a seal between the heat plate 199 and the thermal source 203 to contain the warming liquid within the reservoir and to inhibit warming liquid within the reservoir 125 from coming into contact with the thermal source 203.

Figure 6:
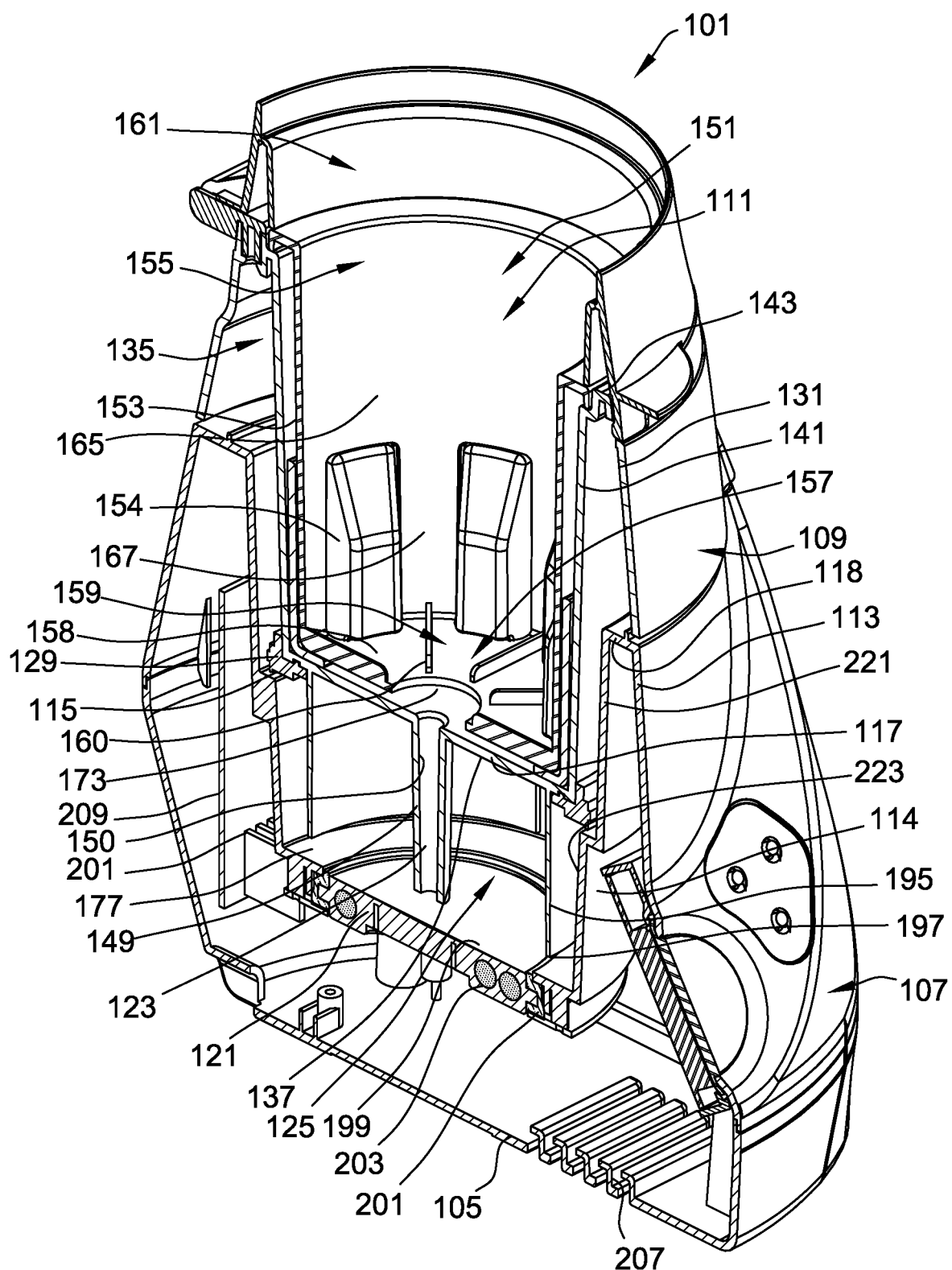
FIG. 6 is a cross-section of the warming apparatus of FIG. 1 taken along the line 6-6.

In the illustrated embodiment, the second housing 107 further includes at least one heat sink 207, which can be seen in FIG. 6, positioned generally adjacent the thermal source 203. It is understood, however, that the warming apparatus 101 can have any suitable number of heat sinks 207. In the illustrated embodiment, the heat sink 207 is attached to a circuit board 209 positioned in the second housing 107. The circuit board 209 is arranged in electrical communication with the heating element 121 such that the circuit board 209 is selectively operable to alter a flow of electrical current to the heating element 121. Further, in the illustrated embodiment, a cooling vent 208 is defined within the base 105 of the second housing 103 of the warming apparatus 101 below the thermal source 203.

With reference again to FIG. 5, in the illustrated embodiment, an opening 211 is defined within the second housing's outer peripheral sidewall 113 and the base 105 to provide a path for an electrical power cord (not shown) into the warming apparatus 101. The electrical power cord is adapted to provide suitable electrical power from a standard household outlet to the warming apparatus 101 including the heating element 121.

As seen in FIGS. 1, 3, and 4, the first housing 109 includes an outer peripheral sidewall 131 and defines an open upper end 133. The outer peripheral sidewall 131 is seated on the upper end of the second housing 107 at the ledge 118 at least in part generally separating the first housing 109 and the second housing 107. Specifically, the outer peripheral sidewall 131 extends vertically in a generally tapered manner from the ledge 118 to the open upper end 133 of the first housing 109 such that the outer peripheral sidewall 131 is generally conical frustum.

In the illustrated embodiment, an inner peripheral sidewall 141 of the first housing 109 is disposed in a transversely spaced relationship with the outer peripheral sidewall 131. The inner peripheral sidewall 141 defines an interior space of the first housing 109. The inner and outer peripheral sidewalls 141, 131 are connected by a suitable connecting panel 143 at respective upper ends of the inner and outer peripheral sidewalls.

In one particularly suitable embodiment, the inner and outer peripheral sidewalls 141, 131 and the connecting panel 143 are formed integrally as a single piece with a lid section 215 (descripted in more detail below) extending over the connecting panel 143. It is understood, however, that the inner and outer peripheral sidewalls 141, 131 of the first housing 109 may be formed separate from each other and attached by the connecting panel 143 or other connecting structure. It is also contemplated that in other embodiments, the inner and outer peripheral sidewalls 141, 131 may not be directly connected to each other and remain within the scope of this disclosure.

With particular reference to FIGS. 3 and 5, a barrier member 151 is also disposed within the first housing 109 and comprises a generally cylindrical barrier wall 153 having an open upper end 155 and a lower end 157, a foodstuff container support base 159 extending transversely inward from the lower end 157 of the barrier wall 153 and a containment region 161 extending generally transversely outward and upward from the upper end 155 of the barrier wall 153 in a generally cylindrically-shaped configuration. The barrier wall 153 is suitably formed of a stiff material. For example, in one suitable material embodiment, the barrier wall 153 is constructed of a hard plastic material. It is understood, however, that the barrier wall 153 may be constructed of other suitable stiff materials without departing from the scope of this disclosure. The barrier wall 153 further defines a plurality of apertures (not shown) circumferentially displaced around the barrier wall 153 and extending generally upward from the lower end 157 of the barrier wall 153.

The barrier member 151 further comprises a barrier sleeve 152 positioned between the inner peripheral sidewall 141 and the barrier wall 153 and extending generally transversely outward and upward from the lower end 157 of the barrier wall 153. The barrier sleeve 152 includes a plurality of ridges 154 extending through the apertures defined within the barrier wall 153. The ridges 154 extend generally upward and at least partially transversely inward within the lower end 157 of the barrier wall 153. The barrier sleeve 152 further extends at least partially between the barrier wall 153 and the first housing base 117 to support the barrier wall 153. The barrier sleeve 152 is suitably formed of a resiliently flexible material to allow transverse expansion of the barrier sleeve 152 upon insertion of the foodstuff container B into the warming compartment 111. In one suitable embodiment, the barrier sleeve 152 is also suitably formed of a relatively thermally insulating material. For example, in one suitable embodiment, the barrier sleeve 152 is constructed of silicone. It is understood, however, that the barrier sleeve 152 may be constructed of other suitable resiliently flexible materials without departing from the scope of this disclosure. It is also understood that the barrier sleeve 152 may be constructed of a material that is not thermally insulating and remain within the scope of this disclosure.

Figure 9:
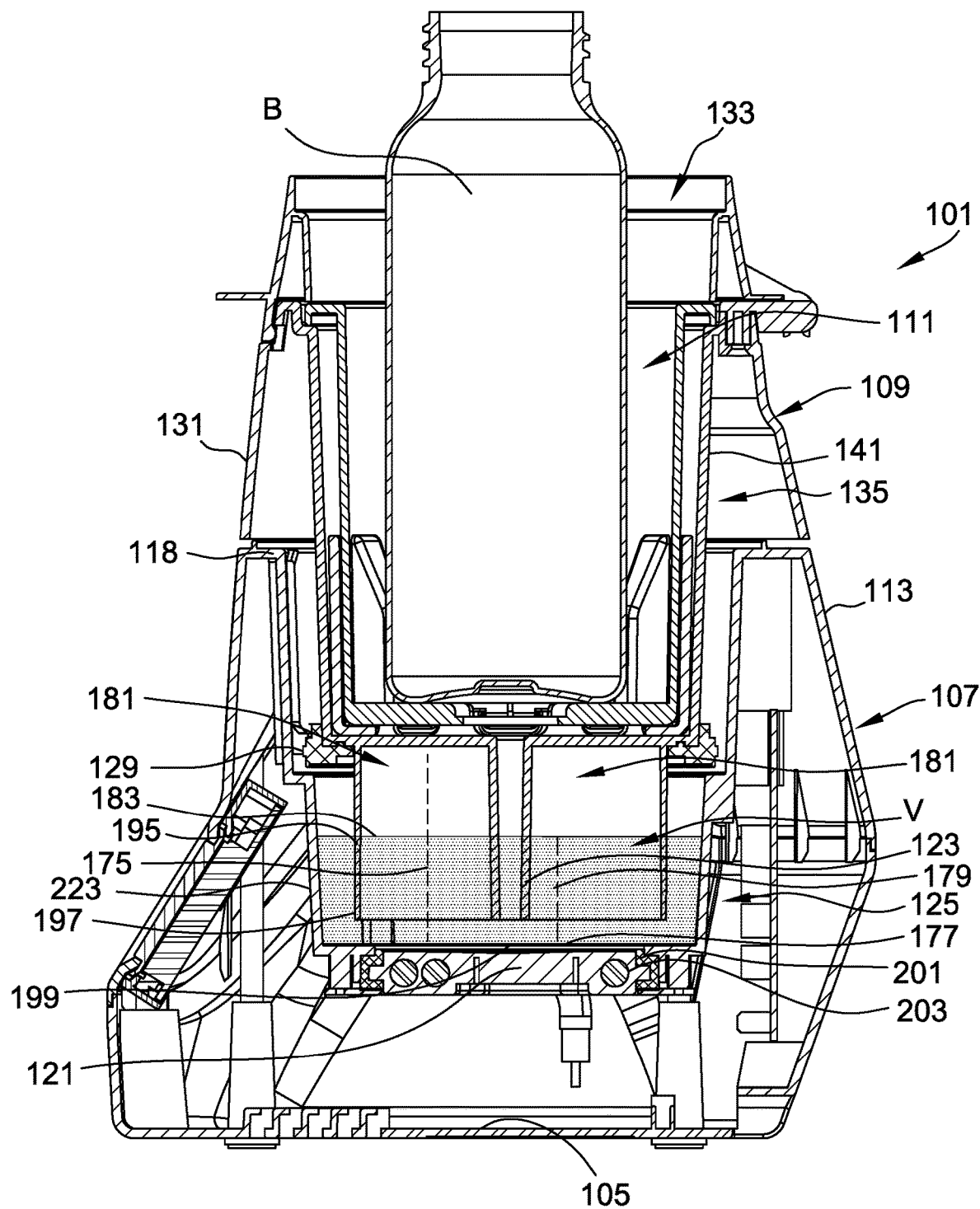
FIG. 9 is a cross-section of the warming apparatus of FIG. 3 taken along the line 9-9 with a foodstuff container in the form of a baby bottle to be warmed disposed in an interior space of the first housing and a warming liquid disposed in a reservoir of the second housing.
Figure 10:
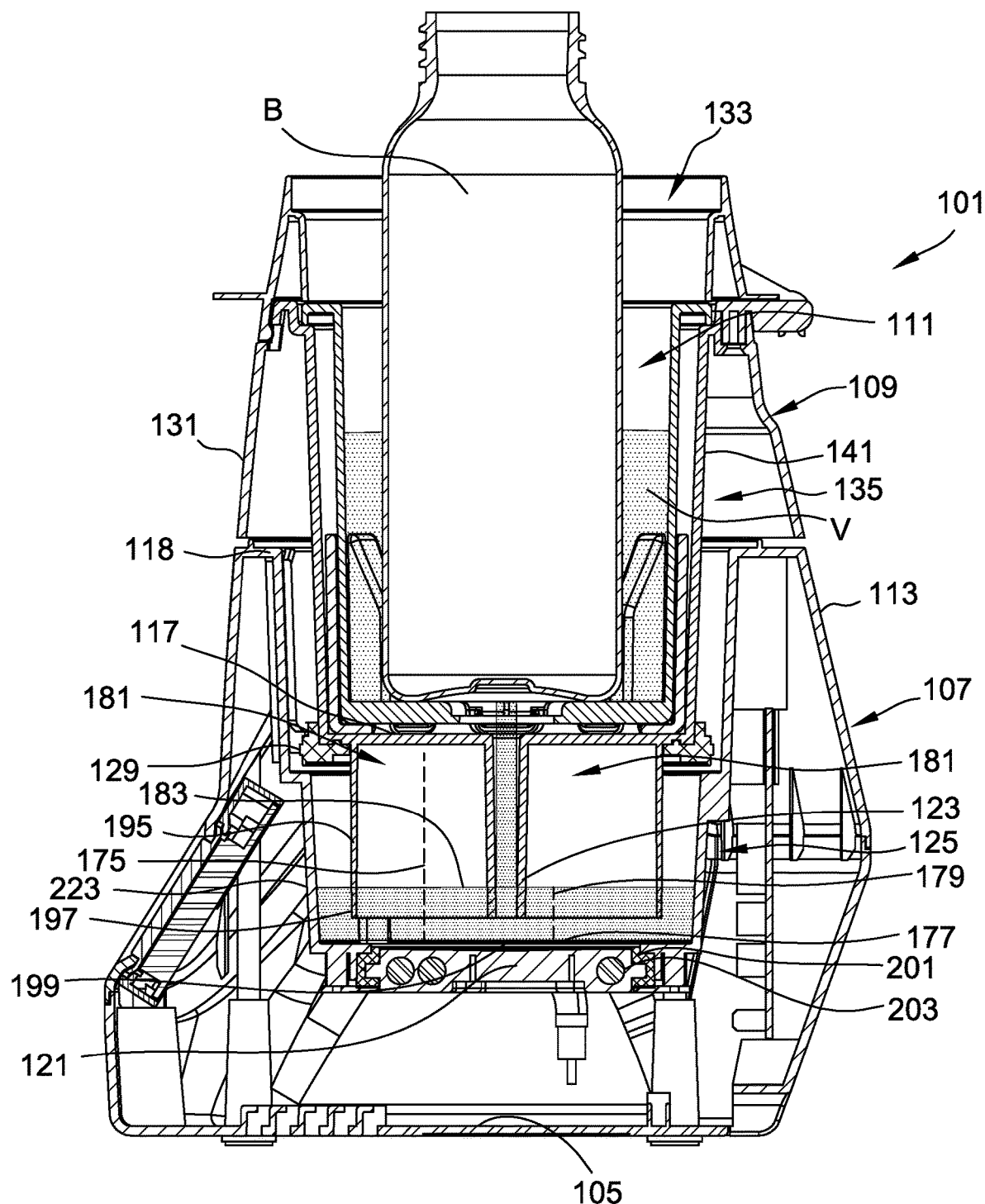
FIG. 10 is a cross-section similar to FIG. 9 with the warming liquid circulating through the warming apparatus to warm the foodstuff container.

The barrier wall 153 and the barrier sleeve 152 define a warming compartment 111 in which the baby bottle B (i.e., the foodstuff container) is received for warming by the warming apparatus 101 (shown in FIGS. 9 and 10). More particularly, the warming compartment 111 is defined by an inner surface 165 of the barrier wall 153 and the barrier sleeve 152. The warming compartment 111 is sized in transverse cross-section (e.g., in width or diameter) substantially similar to or smaller than the transverse cross-sectional dimension of conventional foodstuff containers so that upon insertion of the foodstuff container into the warming compartment 111 the barrier sleeve 152 provides a relatively snug fit about and in contact with at least portions of the foodstuff container outer surface.

In the illustrated embodiment, a plurality of vertically extending channels 167 are formed in the inner surface 165 of the barrier wall 153 between the ridges 154 of the barrier sleeve 152 and extend at least a portion of the height of the barrier wall 153 from the lower end 157 to the upper end 155 of the barrier wall 153. In this manner, when the bottle B is inserted into the warming compartment 111 defined by the barrier wall 153 and the barrier sleeve 152, portions of the inner surface 165 of the barrier wall 153 within the vertically extending channels 167 remain spaced from the bottle B while portions of the ridges 154 of the barrier sleeve 152 remain in contact with and frictionally engage the bottle B as can be seen in FIG. 9. The channels 167 also in part facilitate the resilient expansion of the barrier sleeve 152 when relatively larger containers are inserted into the warming compartment 111.

In the illustrated embodiment, the first housing 109 further includes the lid section 215 hingedly attached to the outer peripheral sidewall 131 of the first housing 109. The lid section 215 includes a hinge 217 and a lifting flap 219 positioned opposite the hinge 217. The lid section 215 retains the barrier member 151 in position when the bottle B, frictionally engaged with the ridges 154 of the barrier sleeve 152, is removed from the warming compartment 111. Additionally, the lid section 215 allows for removing the barrier member 151 from the first housing 109. For example, it is contemplated that a user might remove the barrier member 151 from the first housing 109 by lifting the lid section 215 in order to warm an oversized alternative foodstuff container that would not fit within the barrier member 151.

The containment region 161 of the barrier member 151 extends upward from the upper end 155 of the barrier wall 153 and terminates generally at the upper end or rim of the lid section 215. In the illustrated embodiment, the connecting panel 143 spanning the outer peripheral sidewall 131 and the inner peripheral sidewall 141 is oriented substantially transverse to the inner peripheral sidewall 141. It is understood that in other embodiments, the connecting panel 143 may be sloped or tapered to support a bowl shaped configuration of the containment region 161. The containment region 161 may be shaped in a bowl configuration to inhibit warming liquid that pools within the warming compartment 111 from overflowing the first housing 109 of the warming apparatus 101.

In the illustrated embodiment, a hollow buffer region 135 is defined in the area between inner and outer peripheral sidewalls 141, 131 of first housing 109. Specifically, the hollow buffer region 135 is sealed from the warming compartment 111 to prevent the flow of warming liquid within the warming compartment 111 into the hollow buffer region 135. It is understood, however, that in other suitable embodiments, a plurality of overflow openings may be disposed within the inner peripheral sidewall 141 or the connecting panel 143 to permit the flow of any overflow warming liquid within the warming compartment into the hollow buffer region 135. It is also contemplated that in other embodiments, the inner and outer peripheral sidewalls 141, 131 of the first housing 109 may be connected as a whole such that no hollow region is defined between the inner and outer peripheral sidewalls.

The first housing base 117 is formed integrally with the first housing's outer peripheral sidewall 131 and inner peripheral sidewall 141 at a lower end of the sidewalls and extends transversely thereof across the lower end of first housing 109. Specifically, portions of the first housing base 117 contact a coupling surface 115 extending around an inner circumference of the second housing 107 to support the first housing 109.

Figure 7:
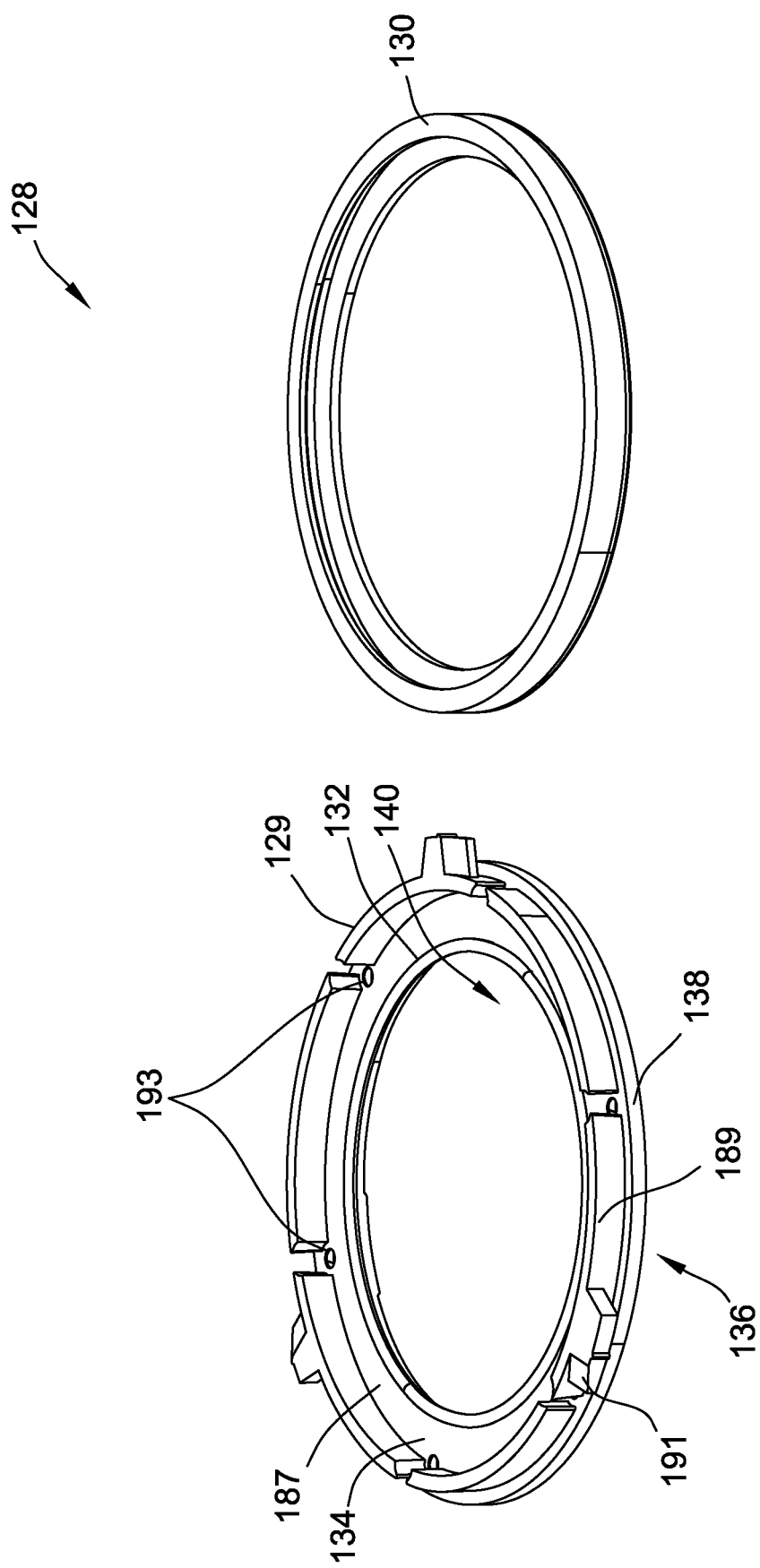
FIG. 7 is a perspective view of sealing mechanism for use in the warming apparatus of FIG. 1.
Figure 8:
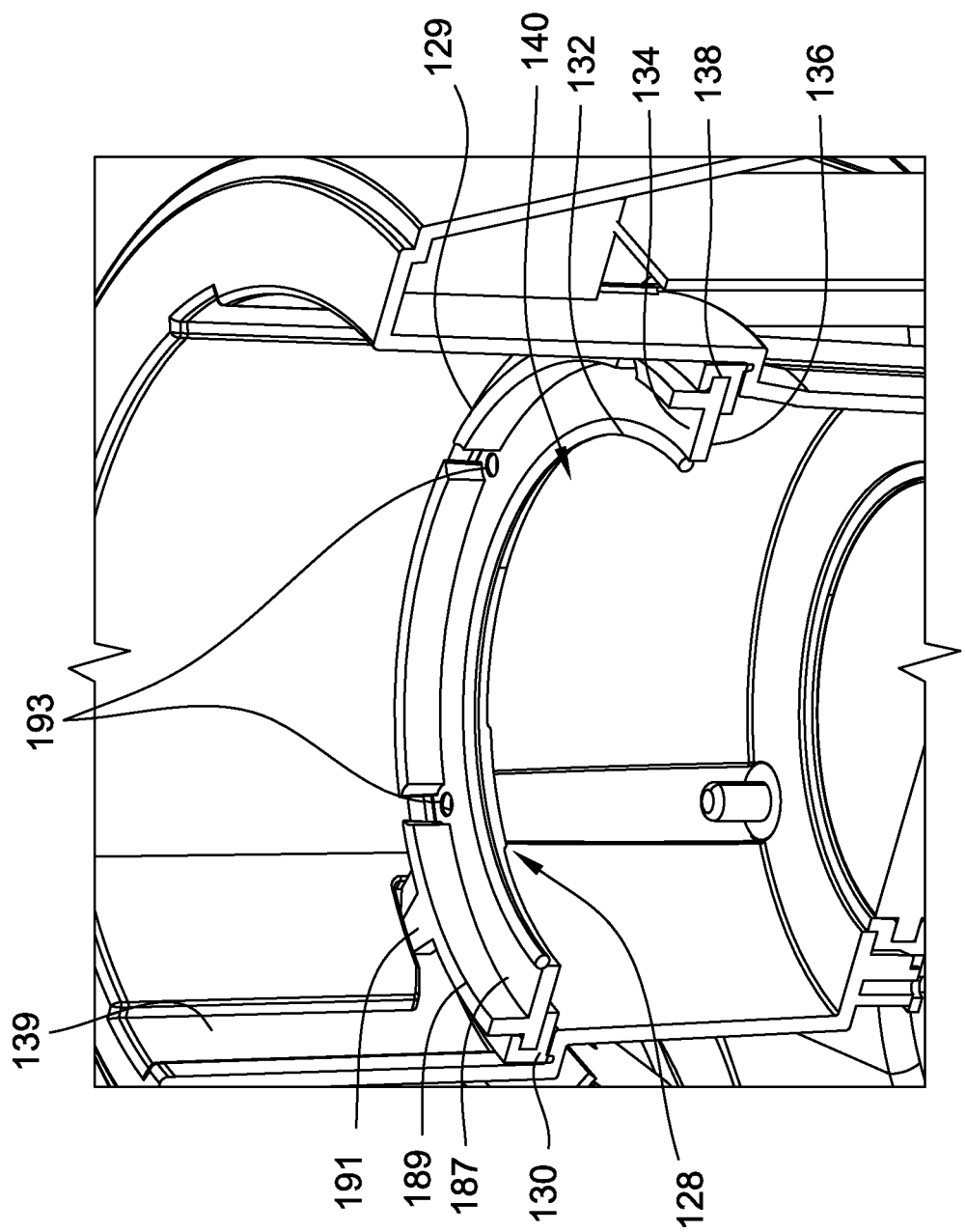
FIG. 8 is an enlarged, fragmented cross-section of the warming apparatus of FIG. 1 with components of the warming apparatus removed to reveal internal construction of the sealing mechanism.

As best seen in FIGS. 7 and 8, a sealing mechanism 128, including a lock ring 129, an outer gasket 130, and an inner gasket 132, is positioned between the coupling surface 115 of the second housing 107 and the first housing base 117. The lock ring 129 comprises a coupling portion 187 with an upper surface 134, a lower surface 136 and a plurality of apertures 193 defined therein and extending through from the upper surface 134 to the lower surface 136. The coupling portion 187 is integrally formed with a lock mechanism 189, which extends transversely to the upper surface 134 of the coupling portion 187. The outer gasket 130 circumferentially surrounds an outside edge 138 of the coupling portion 187 and defines a channel to receive at least a portion of the lock ring 129. The inner gasket 132 is sized smaller than a circular opening 140 within the coupling portion 187. In other embodiments, the inner gasket 132 may be sized similar to or larger than the circular opening 140. In the exemplary embodiment, the outer gasket 130 and the inner gasket 132 are fabricated from silicon and are elastic. In other embodiments, the gaskets 130, 132 may be fabricated from any suitable material that allows the gaskets 130, 132 to function as described here.

The sealing mechanism 128 prevents depressurization of the reservoir 125 when the warming apparatus 101 is in operation. In the illustrated embodiment, the sealing mechanism 128 is coupled to the bottom surface 137 of the first housing 109 by a plurality of screws (not shown) extending through the apertures 193 in the coupling portion 187. In some embodiments, the sealing mechanism 128 may be coupled to the bottom surface 137 by another attachment means, such as, but not limited to, adhesive attachment. With this coupling, the sealing mechanism 128 remains on the first housing 109 when the first housing 109 is detached from the second housing 107. It is understood that in other embodiments, the sealing mechanism 128 is coupled to the coupling surface 115 of the second housing 107 such that the sealing mechanism 128 remains on the second housing 107 when the second housing 107 is detached from the first housing 109.

Further, in the illustrated embodiment, the outer gasket 130 is interposed between the lock ring 129 and the coupling surface 115, creating a seal therebetween. The inner gasket 132 is interposed between the lock ring 129 the bottom surface 137 of the first housing 109, creating a seal therebetween. It is understood that in other embodiments, the gaskets 130, 132 create seals between other portions of the first housing 109 and/or the second housing 107. Further, it is understood that in other embodiments the sealing mechanism 128 does not include one or both gaskets 130, 132 and seals are created between the first housing 109 and the second housing 107 by another means.

The lock mechanism 189 includes a plurality of locks 191 extending tangentially from an outer circumference of the lock mechanism 189. Locks are adapted to engage a respective set of L-shaped lock channels 139 defined within the second housing 107 such that a user attaches the first housing 109 to the second housing 107 by aligning the locks 191 with the lock channels 139 and then lowering the first housing 109 within the second housing 107 until the locks 191 reach a lowest most point of the lock channels 139. The user then twists the first housing 109 to guide the locks 191 around circumferential lower extensions of the lock channels 139, thereby locking the first housing 109 to the second housing 107.

A conduit 123 is also formed integrally with and extends vertically downward in a transverse direction from the first housing base 117 to allow fluid communication between the reservoir 125 of the second housing 107 and the warming compartment 111 (and more broadly, the interior space of the first housing 109). The conduit 123 includes a channel 150 therein. Specifically, the conduit 123 extends to a distal end 145 positioned adjacent the heating element 121. It is understood that in other embodiments, the conduit 123 may extend to a different depth within the reservoir 125. In the illustrated embodiment, the conduit 123 is centrally located within the warming apparatus 101 such that the conduit 123 is positioned to extend along a vertical center line 147 of the reservoir 125. That is, the conduit 123 is positioned such that, when the first housing 109 is coupled to the second housing 107, the conduit 123 extends into the reservoir 125 such that there exists a substantially equal volume of warming liquid (shown in FIGS. 9 and 10) between the conduit 123 and the reservoir sidewall 223 in all radial directions. Thus, in operation, air pressure acting on the surface 183 of the warming liquid, as will be described later in greater detail, applies a downward force on the warming liquid which forces the warming liquid up through the conduit 123. Therefore, the conduit 123 is located at the net position of the total force acting on the warming liquid surface 183 (shown in FIGS. 9 and 10) within the reservoir 125 when the heating operation is initiated.

The conduit 123 enables warming liquid to flow from the reservoir 125 and into the warming compartment 111 and from the warming compartment 111 into the reservoir 125. Thus, conduit 123 is arranged to provide for two-way fluid flow therethrough. It is also contemplated that in other embodiments, the first housing 109 may include multiple conduits extending into the reservoir 125 and remain within the scope of this disclosure. The conduit 123 also acts as a seal for air pressure contained within the reservoir 125. For example, and as will be described in greater detail with respect to FIGS. 9 and 10, in operation, the heating element 121 heats the warming liquid to a temperature such that some of warming liquid begins to evaporate. The resulting water vapor causes an air pressure buildup within the reservoir 125. The pressure buildup in the reservoir 125 is then used, to move the warming liquid into the warming compartment 111 through the channel 150. Thus, the conduit 123 also seals air pressure within the reservoir 125, preventing it from escaping through the channel 150 while also providing an outlet for warming liquid to flow into the warming compartment 111. However, the conduit 123 will only seal air pressure within the reservoir 125 if the total volume of warming liquid within the reservoir 125 has a depth greater than a distance from the distal end 145 of the conduit 123 to the reservoir bottom 177. Therefore, in the illustrated embodiment, the conduit 123 extends a sufficient distance within the reservoir 125 such that the distal end 145 of the conduit 123 is positioned below the surface 183 of the warming liquid (shown in FIGS. 9 and 10) when the warming apparatus 101 is in operation.

Figure 11:
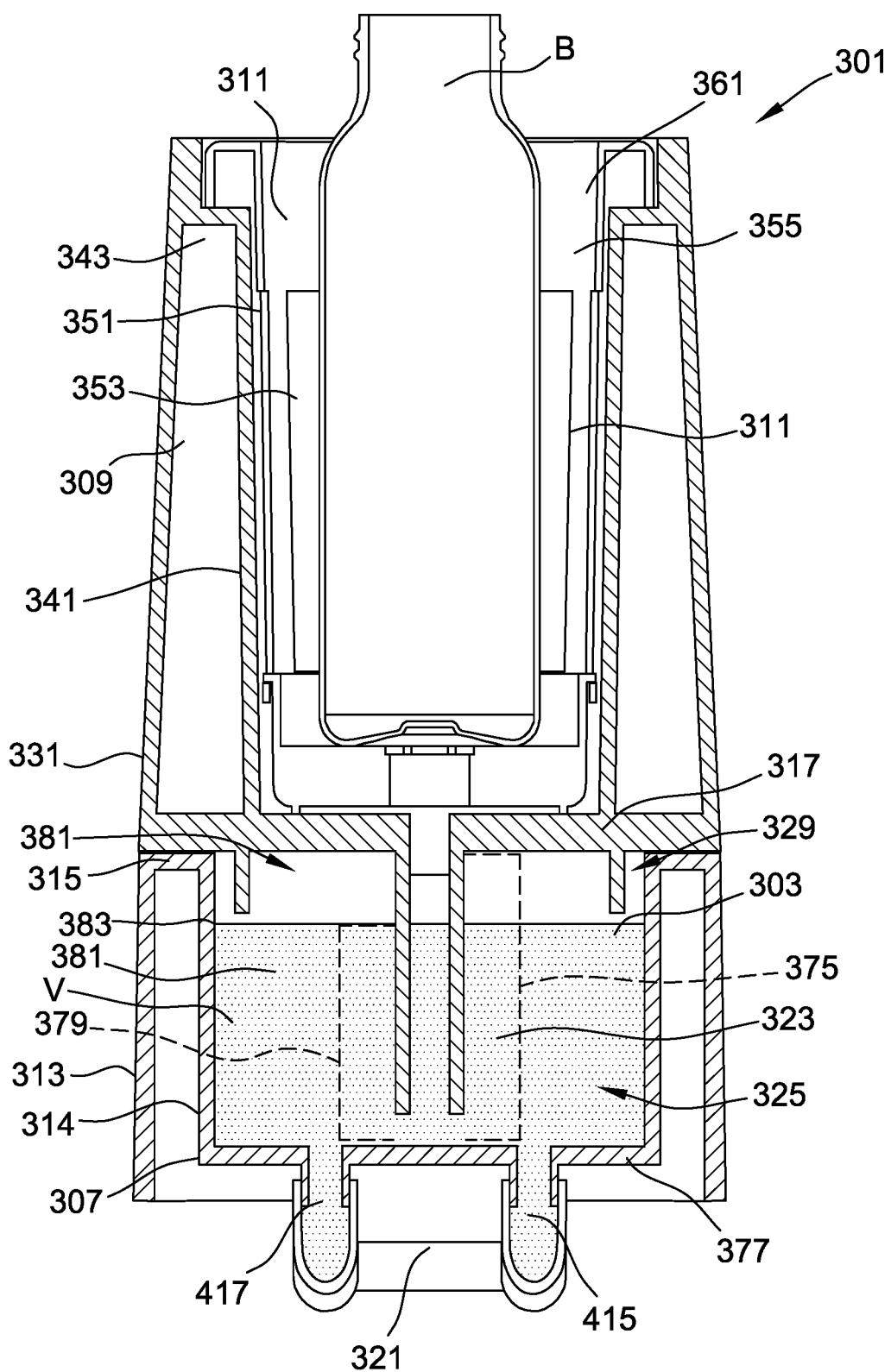
FIG. 11 is a cross-section of a second embodiment of a warming apparatus of the present disclosure for warming the contents of a foodstuff container, the warming apparatus having a first housing attached to a second housing, a foodstuff container to be warmed being seen disposed in an interior space of the first housing and a warming liquid being seen in a reservoir of the second housing.
Figure 12:
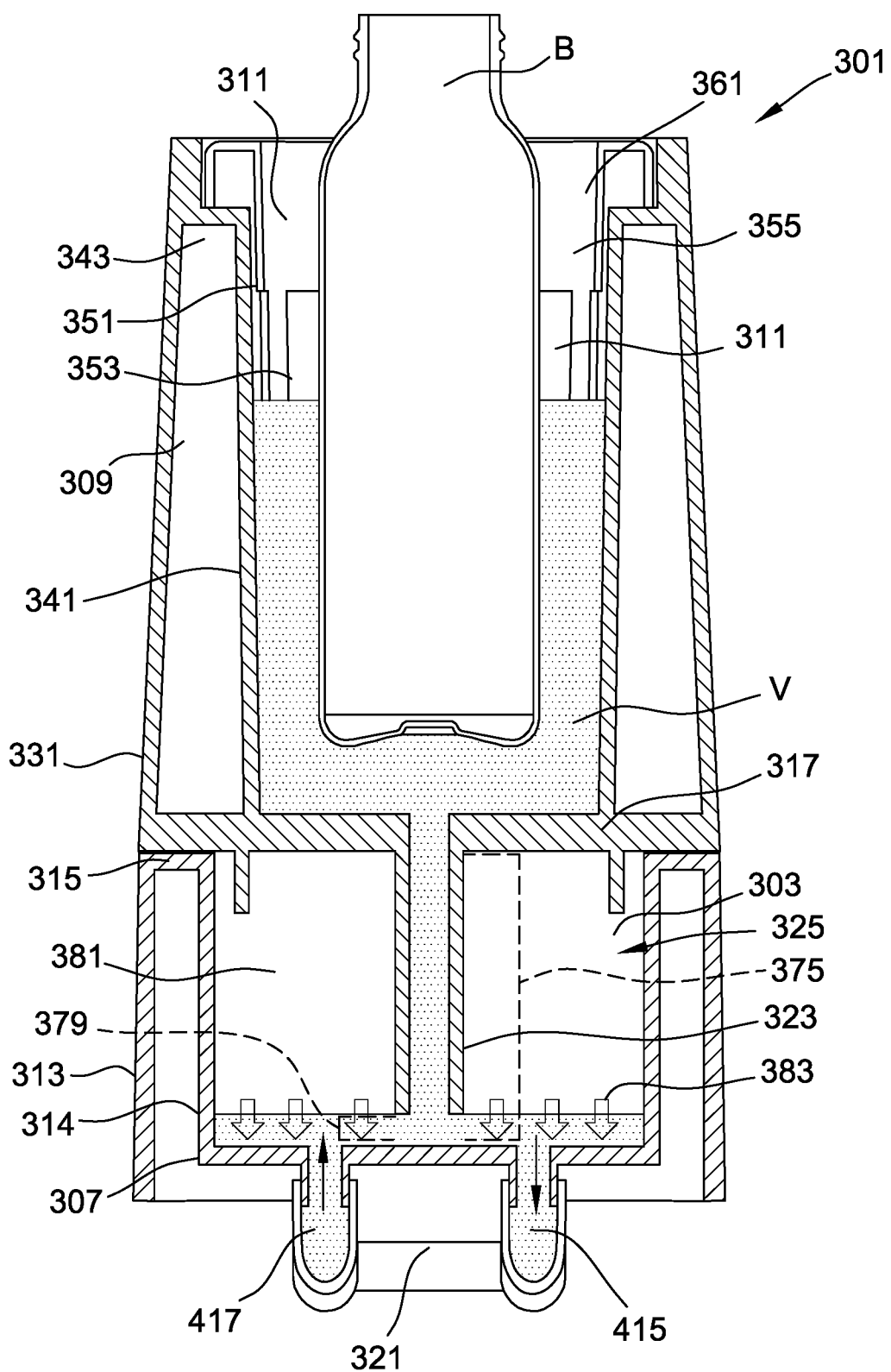
FIG. 12 is a cross-section similar to FIG. 11 but with the warming liquid being circulated through the warming apparatus to warm the foodstuff container.
Figure 13:
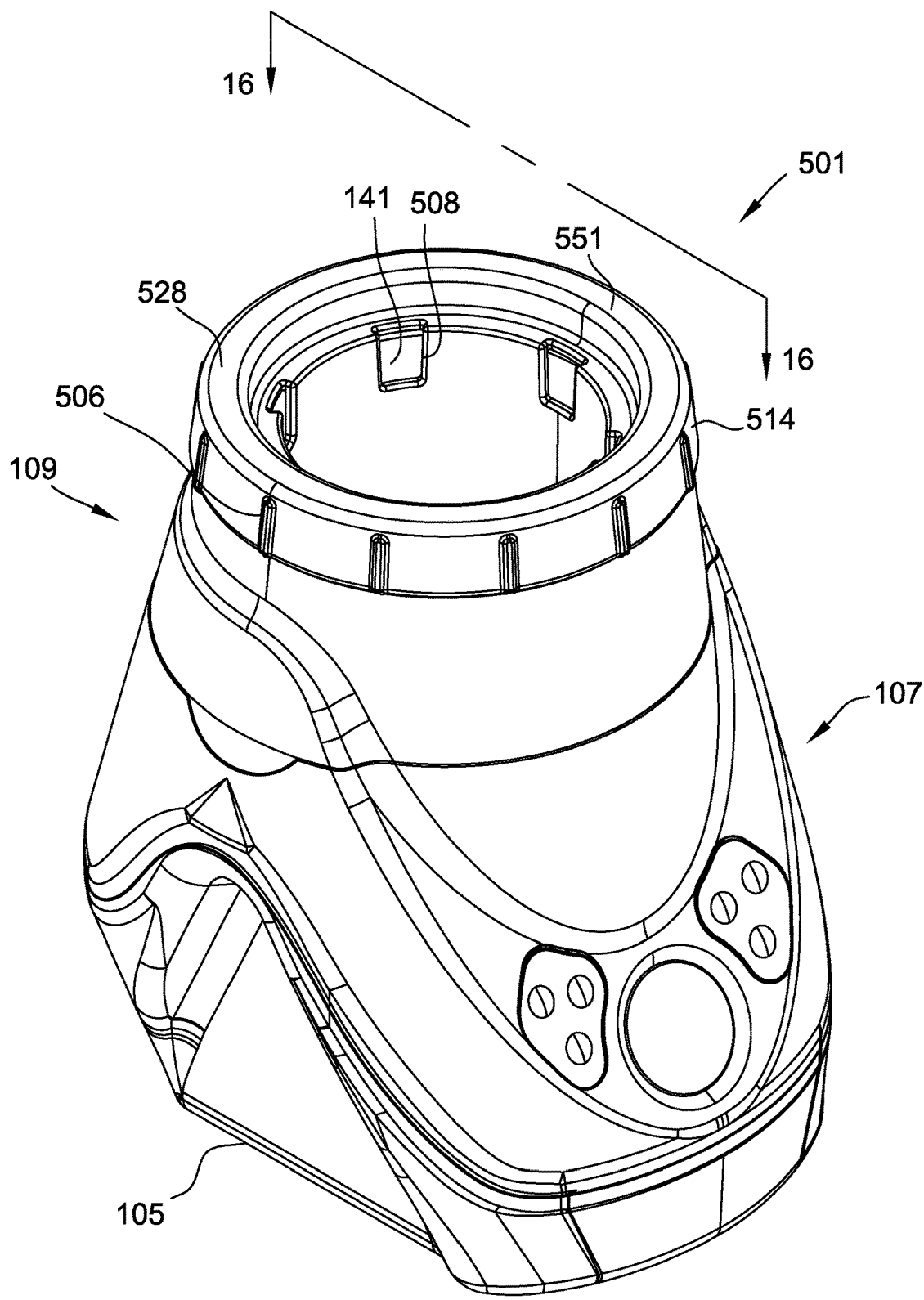
FIG. 13 is a perspective view of a third embodiment of a warming apparatus of the present disclosure for warming the contents of a foodstuff container, the warming apparatus having a first housing attached to a second housing and a barrier member.
Figure 14:
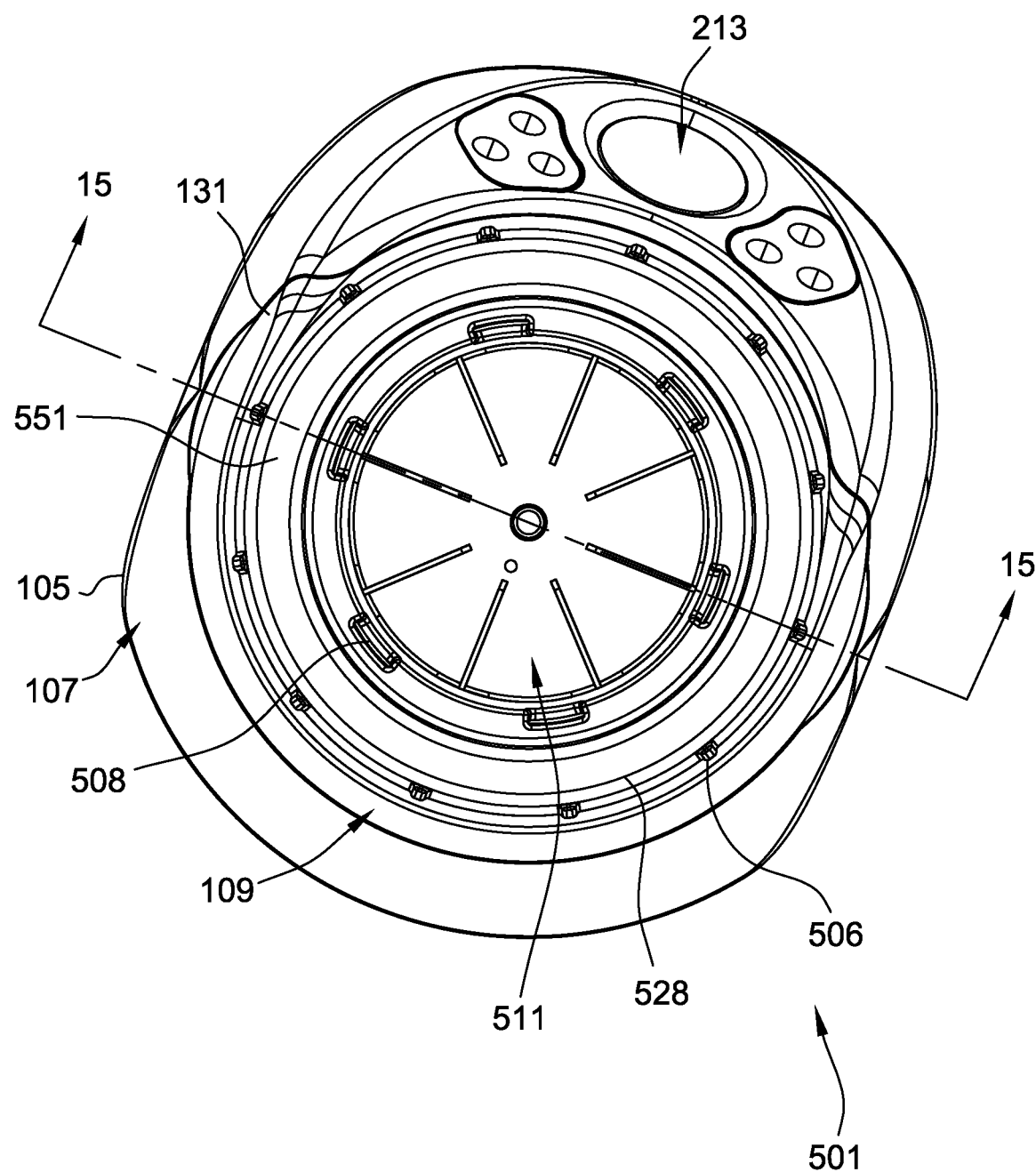
FIG. 14 is a top view of the warming apparatus of FIG. 13.
Figure 15:
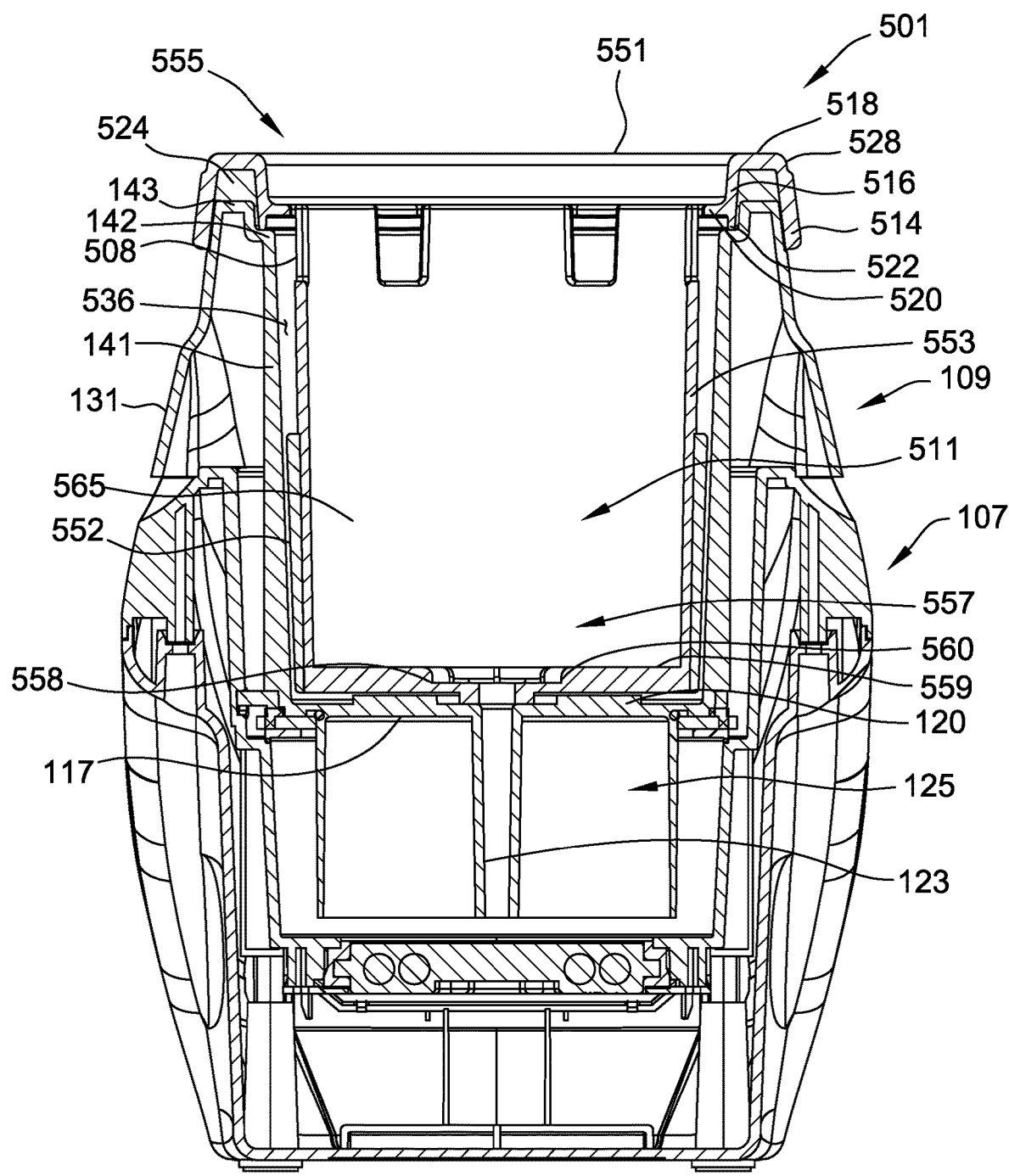
FIG. 15 is a cross-section of the warming apparatus of FIG. 14 taken along the line 15-15.

An annular reservoir divider 195 is also formed integrally with and extends vertically downward in a transverse direction from the first housing base 117 to a free distal end 197. Specifically, the reservoir divider 195 defines a circumference about a transverse cross section positioned within a similarly oriented circumference of the reservoir sidewall 223 of the second housing 107. Additionally, the reservoir divider 195 extends substantially an equal vertical distance into the reservoir 125 when the first housing 109 is coupled to the second housing 107 as the conduit 123. Thus, the reservoir divider 195 allows for fluid communication between the warming liquid (shown in FIGS. 9 and 10) in the portion of the reservoir 125 outside of the divider 195 while restricting fluid communication of air pressure accumulated above the surface 183 of the warming liquid within the reservoir divider 195 and the portion of the reservoir 125 exterior of the reservoir divider 195. As a result, relatively less heat is needed to move the warming liquid through the conduit 123 during the warming operation described in greater detail below. In particular, relatively less heat is required because only the warming liquid, shown in FIGS. 9 and 10, positioned interior of the reservoir divider 195 needs to be heated for air pressure to build sufficiently to begin moving warming liquid through the conduit 123. It is also understood that in other embodiments, the first housing 109 may not have any reservoir dividers 195 such that the conduit 123 is the only portion of the first housing 109 extending into the reservoir (as shown in FIGS. 11 and 12) and still remain within the scope of this disclosure.

In the illustrated embodiment, the foodstuff container support base 159 circumscribes the lower end 157 of the barrier wall 153. The foodstuff container support base 159 is at least partially supported by and lays flat against a base 149 of the barrier sleeve 152. The base 149 of the barrier sleeve 152 is supported by and lays flat against the first housing base 117. An opening 173 in the foodstuff container support base 159 is aligned with the conduit 123 to allow fluid communication between the reservoir 125 and the warming compartment 111 via the opening 173. The support base 159 includes a shelf support 158 circumscribing the lower end 157 of the barrier wall 153 and a plurality of support struts 160 attached on top of the shelf support 158 and extending radially inward from the barrier wall 153 towards the opening 173. Support struts are configured to support the foodstuff container B within the barrier member 151 such that, during the warming operation, the warming liquid (shown in FIGS. 9 and 10) may flow freely between the shelf support 158 and the support struts 160 without being resisted by the foodstuff container B. It is understood that in alternative embodiments, a support base 159 may not be necessary to support foodstuff container B. For example, in some embodiments, foodstuff container B may be in contact with and supported by first housing base 117.

A control system, indicated generally at 213, is positioned on the outer peripheral sidewall 113 of the second housing 107. The control system 213 is operable to be controlled by the user to start or stop a warming operation of the warming apparatus 101. The control system 213 may also include a display (not shown) for displaying a timer for time left in a warming operation or for displaying a category of warming operations to be selected from by a user. In other embodiments, a temperature sensor (not shown) may be disposed within the first housing 109 such that the temperature sensor is capable of measuring the temperature of the warming liquid within the warming compartment 111 and/or in the second housing 107 to measure the temperature of the warming liquid in the reservoir 125 of the second housing. It is understood that in these embodiments, the control system 213 may be in communication with the temperature sensor such that the control system 213 may control the heating operation based at least in part on a measurement of the temperature sensor.

As best seen in FIGS. 9 and 10, in operation, the reservoir 125 of the second housing 107 is filled with a suitable warming liquid, typically water, through the second housing opening defined by the inner peripheral sidewall 114 when the second housing 107 is detached from the first housing 109 (as illustrated in FIG. 4). It is understood that other embodiments of the warming apparatus 101 may also include a fill opening (not shown) positioned in the outer peripheral sidewall 113 of the second housing 107 and in fluid communication with the reservoir 125 in order to fill the reservoir with warming liquid without having to detach the first housing 109 from the second housing 107. A suitable volume V of the warming liquid is necessary for operation of the warming apparatus. Thus, the second housing 107 can be provided with suitable indicia (e.g., one or more fill lines) to indicate to the user when a suitable amount of volume is placed in the reservoir. After a suitable volume V of warming liquid is placed in the reservoir of the second housing 107, the first housing 109 can be manually attached to the second housing.

A container containing foodstuff, such as the baby bottle B, is inserted down into the warming compartment 111 (or more broadly the interior space) of the first housing 109.

When the warming apparatus 101 is in an nonoperating mode, at least one air pocket 181 is defined and contained within the reservoir 125 between the surface 183 of warming liquid, the first housing base 117, and reservoir sidewall 223. Specifically, in the illustrated embodiment, air pockets 181 are defined on opposite sides of the conduit 123 and between the reservoir divider 195 and additional air pockets 181 are defined between the reservoir sidewall 223 and the reservoir divider 195.

After insertion of the baby bottle B into the warming compartment of the first housing 109, a warming operation is then initiated by the user using the suitable control system 213 best seen in FIG. 2. In the warming operation, the heating element 121 rapidly heats the warming liquid within the reservoir 125 to a suitable predetermined temperature. Specifically, in operation, an electrical current is provided to the thermal source 203 via the external electrical power source (not shown). The thermal source 203 converts electrical energy from the external electrical source to thermal energy, which is radiated from the thermal source 203 to the heat plate 199. The heat plate 199 has a sufficiently large surface area disposed in contact with the warming liquid such that the heat plate is able to rapidly transfer heat to the warming liquid within the reservoir 125. As the warming liquid is heated, the heated regions of warming liquid become less dense and therefore rise within warming liquid volume V. Thus, operation of the thermal source 203 causes a cycling of the warming liquid within the reservoir 125 whereby the cooler regions of warming liquid are cycled to be closest in contact with the heat plate 199.

As the average overall temperature of the volume V of warming liquid rises, the air pressure within the air pockets 181 also increases. Specifically, when the average temperature of the warming liquid hits around 80 degrees Fahrenheit, the air pressure within the air pockets 181 becomes high enough to exert a downward force on warming liquid sufficient to affect a rise in the warming liquid through the conduit 123. It is understood, however, that different average temperatures of the warming liquid may be necessary or sufficient to move the warming liquid through the conduit 123. For example, it is contemplated that in other embodiments, the average temperature of the warming liquid necessary to move the warming liquid through the conduit 123 is any temperature around less than the boiling temperature of the warming liquid. Sufficiently heating the warming liquid within the reservoir 125 causes the warming liquid to flow up through the conduit 123 and into the warming compartment 111 (more broadly interior space) of the first housing 109.

As the volume of heated warming liquid delivered to the warming compartment 111 increases, thus raising the level of heated warming liquid in the warming compartment 111, the heated warming liquid flows upward along the outer surface of the container B. Conversely, the container B will typically be at a room temperature or at a refrigerated temperature including frozen. Thus, as heated warming liquid comes into contact with the container B, the container absorbs thermal energy from the heated warming liquid. In this matter, contact between heated warming liquid and the container B results in a heating of the contents of the foodstuff container and a cooling of the surrounding warming liquid. The cooling of the warming liquid increases the density of the warming liquid and thus the cooler regions of the warming liquid sink relative to the total volume V of warming liquid. In contrast, the warming liquid positioned at the bottom of the reservoir 125 is heated due to its proximity to the heat plate 199. When the warming liquid is heated, it becomes less dense, causing in to rise relative to volume V of warming liquid. Specifically, warming liquid rises within the conduit 123 after it is heated. In other words, operation of the heat plate 199 when the heated warming liquid is forced into the warming compartment 111, results in a cycling of warming liquid within the warming apparatus 101 between the warming compartment 111, which contains warming liquid at a relatively lower temperature, and the reservoir 125, which contains warming liquid at a relatively higher temperature, through the conduit 123.

Once the warming operation is completed, such as when a desired foodstuff temperature or warming time is reached, operation of the heating element 121 (and hence the pump action of the thermal heat pump of the illustrated embodiment) ceases. This may be done automatically by the control system 213 or manually by the user interacting with the control system to shut the warming apparatus 101 off.

Further, when transitioned from an operation mode to an nonoperating mode, the removal of additional thermal energy radiated to the heat plate 199 from the thermal source 203 within the reservoir 125 causes the warming liquid within the reservoir 125 to cool. As the warming liquid within the reservoir 125 cools, water vapor within the air pockets 181 condenses to liquid form within the reservoir 125. As a result, air pressure within the air pockets 181 begins to drop which, in turn, lessens the pushing force on the surface 183 of the warming liquid. The warming liquid within the warming compartment 111 of the first housing 109 is therefore allowed to drain through the conduit 123 back into the reservoir 125. Additionally, as the warming liquid within the reservoir 125 cools, the drop in air pressure can cause a lower air pressure within the reservoir 125 than in the warming compartment 111. This pressure differential causes a sucking air flow from the warming compartment 111 into the reservoir 125 through the conduit 123 which sucks warming liquid remaining within the warming compartment 111 into the reservoir 125. Thus, heated warming liquid remaining in the warming compartment 111 will continue to flow out of the warming compartment 111 back to the reservoir 125 via the conduit 123 to inhibit further warming of the contents of the container B.

FIGS. 11 and 12 illustrate a second embodiment of a warming apparatus 301 that is similar to the warming apparatus 101 of FIGS. 1-10. In the illustrated embodiment, the warming apparatus 301 includes a second housing 307 having a base 305 for supporting the warming apparatus on a surface. Additionally, the second housing 307 comprises an outer peripheral sidewall 313 extending up from the base 305 and an inner peripheral sidewall 314 transversely spaced from the outer peripheral sidewall 313. A coupling surface 315 is formed integrally with the outer peripheral sidewall 313 at an upper end of the outer peripheral sidewall 313 and extends transversely thereof across the second housing 307 to the upper portion of the inner peripheral sidewall 314 of the second housing 307. The coupling surface 315 is configured to contact the first housing base 317 via the sealing mechanism 329. The inner peripheral sidewall 314 is also formed integrally with the coupling surface 315 and the outer peripheral sidewall 313.

A reservoir 325 is defined within the second housing 307 and is configured to contain a volume of a warming liquid. Specifically, the reservoir 325 is defined within the inner peripheral sidewall 314 for containing warming liquid to be used in warming the contents of the foodstuff container B in the manner described later herein. The inner peripheral sidewall 314 extends downward a maximum reservoir depth 375 a distance from the first housing base 317 to a reservoir bottom 377. The reservoir bottom 377 is integrally formed with the inner peripheral sidewall 314 and is transversely spaced from the base 305. Further, the reservoir bottom 377 extends between the inner peripheral sidewalls 314.

An inlet 415 and an outlet 417 are defined within the reservoir bottom 377 and extend a vertical distance downward from the reservoir bottom 377 towards the base 305. In the illustrated schematic, the inlet 415 and the outlet 417 extend a vertical distance beyond the base 305 of warming apparatus to define a lowermost surface of the warming apparatus 301. However, in practice, the base 305 is disposed at an area below the inlet 415 and the outlet 417 such that base 305 defines a lowermost surface of the warming apparatus 301.

In the illustrated embodiment, the reservoir 325 is filled with a volume V of warming liquid. Volume V has a depth indicated at 379 representing the vertical depth of the warming liquid within the reservoir 325. In the illustrated embodiment, depth 379 of volume V of warming liquid is less than the maximum depth of the reservoir indicated at 375. Thus, air pockets 381 are defined and contained within the reservoir 325 between the surface 383 of warming liquid, first housing base 317, conduit 323, and inner peripheral sidewall 314. Specifically, in the illustrated embodiment, two air pockets 381 are defined on opposite sides of the conduit 323.

A suitable heating element 321 is disposed in the interior space of the second housing 307 and is coupled to be in thermal communication with the reservoir 325. In the illustrated embodiment, the heating element 321 is a thermal heat pump, the construction and operation of which is known to those of ordinary skill in the art. A similar type thermal heat pump is disclosed in U.S. Pat. No. 6,906,289 issued Jun. 14, 2005 and entitled Warming apparatus for Heating a Vessel Containing Foodstuffs. In particular, the inlet 415 extends from the reservoir 325 to the heating element 321 for delivering cooler warming liquid from the reservoir 325 to the heating element 321. In the illustrated embodiment, the delivery is by gravity feed from the reservoir 325 to the heating element 321. The outlet 417 is arranged in fluid communication with the inlet 415 and extends up from the heating element 321 to the reservoir bottom 377.

In an operation mode, the heating element 321 rapidly heats the warming liquid delivered thereto from the reservoir 325, bringing it to a boil such that air pressure resulting from the boiling warming liquid causes a rise of heated warming liquid up through the outlet 417 into the reservoir 325. As it is heated and expelled through the outlet 417, the heated warming liquid 403 has a lower density relative to the volume of warming liquid within the reservoir 325 and therefore rises within the reservoir 325. As the colder warming liquid within the reservoir is cycled through the heating element 321, an average temperature of the warming liquid within the reservoir 325 begins to rise.

As the average overall temperature of the volume V of warming liquid rises, the air pressure within the air pockets 381 also increases. Specifically, when the average temperature of the warming liquid hits around 80 degrees Fahrenheit, the air pressure within the air pockets 381 becomes high enough to exert a downward force on warming liquid sufficient to affect a rise in the warming liquid through the conduit 323. Thus, heating the warming liquid within the reservoir 325 causes the warming liquid to flow up through the conduit 323 and into the warming compartment 311 (more broadly the interior space) of the first housing 309.

FIGS. 13-16 illustrate a third embodiment of a warming apparatus 501 that is similar to the warming apparatus 101 of FIGS. 1-10. Features of the warming apparatus 501 are referred to with the same reference numbers as like features of the warming apparatus 101. The warming apparatus 501 differs from the warming apparatus 101 in that the warming apparatus 501 includes a barrier member 551 that is different from the barrier member 151 of the warming apparatus 101. In the illustrated embodiment, the barrier member 551 is disposed within the first housing 109. The barrier member 551 comprises a generally cylindrical barrier wall 553 having an open upper end 555 and a lower end 557 and a foodstuff container support base 559 extending transversely inward from the lower end 557 of the barrier wall 553. The barrier wall 553 is suitably formed of a stiff material. For example, in one suitable material embodiment, the barrier wall 553 is constructed of a hard plastic material. It is understood, however, that the barrier wall 553 may be constructed of other suitable stiff materials without departing from the scope of this disclosure.

The barrier member 551 also includes a barrier rim 528 at the upper end 555 including an inner rim sidewall 516 offset from and connected to the barrier wall 553 by an inner ledge 520 and an outer rim sidewall 514 transversely spaced from the inner rim sidewall 516. A rim ledge 518 is formed integrally with the inner rim sidewall 516 at the upper end 555 of the barrier member 551 and extends transversely thereof to the outer rim sidewall 514 at the upper end 555 of the barrier member 551. The outer rim sidewall 514 is also formed integrally with the rim ledge 518 and the inner rim sidewall 516. The outer rim sidewall 514 extends downwardly over the outside of the outer peripheral sidewall 131. The outer rim sidewall 514 includes a plurality of ridges 506 extending radially outward from the rim ledge 518 and along the length of the outer rim sidewall 514. The ridges 506 are spaced circumferentially equidistance apart around the annular barrier rim 528. The ridges 506 may be used when gripping the barrier rim 528, for example, for removal of the barrier member 551 from the first housing 109 or removal of the barrier member 551 and the first housing 109 from the second housing. In the illustrated embodiment, twelve ridges 506 are spaced along the barrier rim 528. However, it is contemplated that the outer rim sidewall 514 may include more, fewer, or no ridges 506.

The inner rim sidewall 516 further includes an extension 522 extending downwardly beyond the inner ledge 520 and configured to rest on an inner peripheral sidewall ledge 142 defined in the inner peripheral sidewall 141 adjacent the connecting panel 143.

Figure 17:
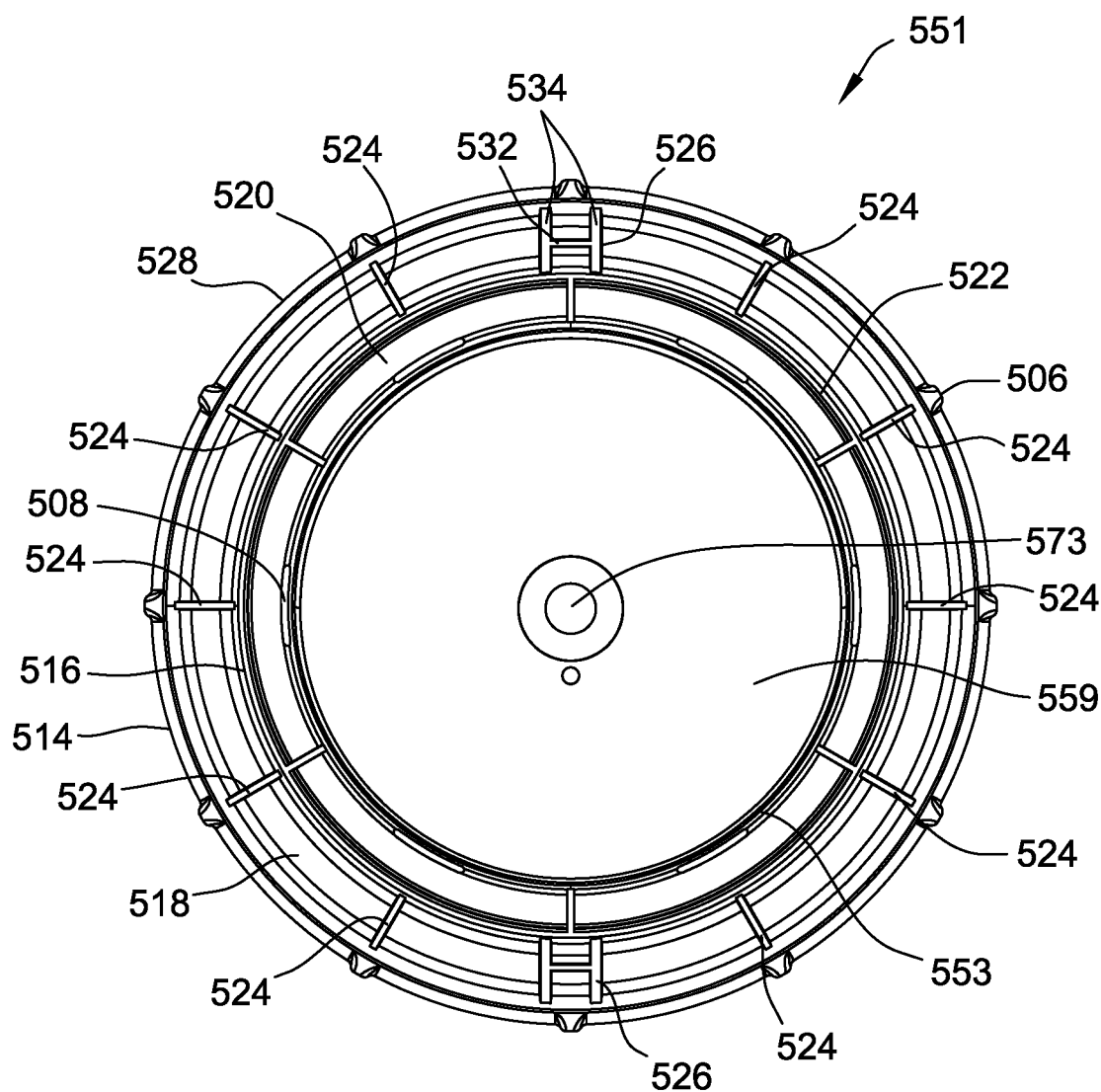
FIG. 17 is a bottom view of the barrier member of the warming apparatus of FIG. 13.

Referring to FIG. 17, the barrier member 551 further includes a plurality of dividers 524 and a plurality of alignment mechanisms 526 extending from the rim ledge 518 between the inner rim sidewall 516 and the outer rim sidewall 514. The dividers 524 provide structural support and rigidity for the barrier rim 528 and may be configured to rest on the connecting panel 143. Each alignment mechanism 526 consists of two dividers 532 joined by a connection member 534.

Figure 16:
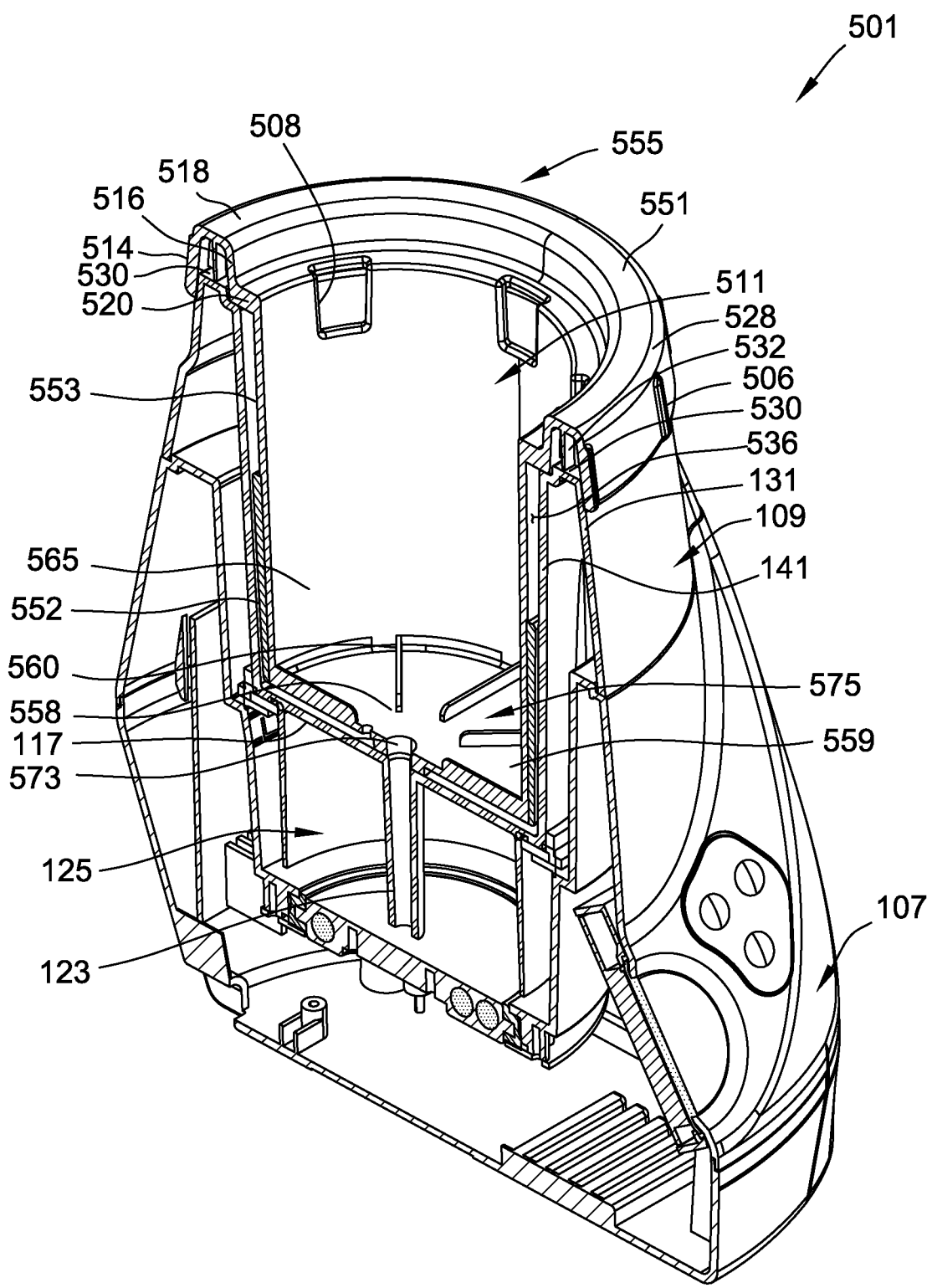
FIG. 16 is a cross-section of the warming apparatus of FIG. 13 taken along the line 16-16.

As seen in FIGS. 16 and 17, two opposing alignment mechanisms 526 are configured to fit within a pair of opposing lips 530 defined within the connecting panel 143. In the illustrated embodiment, the two opposing alignment mechanisms 526 are spaced equidistant circumferentially about the annular barrier rim 528 and align with two opposing ridges 506. In addition, the dividers 524 are spaced about the annular barrier rim 528 equidistant circumferentially between the alignment mechanisms 526. The ten dividers 524 are aligned with ten of the ridges 506. However, it is contemplated that the barrier rim 528 may include more, fewer, or no dividers 524. Further, it is contemplated that the barrier rim 528 may include more, fewer, or no alignment mechanisms 526.

The barrier wall 553 defines a warming compartment 511 in which the baby bottle (i.e., the foodstuff container) is received for warming by the warming apparatus 501. More particularly, the warming compartment 511 is defined by the inner surface 565 of the barrier wall 553. The warming compartment 511 is sized in transverse cross-section (e.g., in width or diameter) larger than the transverse cross-sectional dimension of conventional foodstuff containers so that the foodstuff container is easily insertable into and removable from warming compartment 511.

The barrier member 551 further comprises a plurality of rectangular openings 508 defined in the barrier wall 553 and the inner ledge 520. The rectangular openings 508 extend from the inner ledge 520 downward into the barrier wall 553 toward the lower end 557. In the illustrated embodiment, a gap 536 is located between the barrier wall 553 and the inner peripheral sidewall 141 below the inner ledge 520. The openings 508 allow flow communication between the gap 536 and the warming compartment 511 and expose portions of the peripheral sidewall 141 to ambient air. In other embodiments, the barrier member 551 includes more, fewer, or no rectangular openings 508.

The barrier member 551 further comprises a barrier sleeve 552 positioned between the inner peripheral sidewall 141 and the barrier wall 553. The barrier sleeve 552 extends generally transversely outward and upward from the lower end 557 of the barrier wall 553 and forms the lower boundary of the gap 536. The barrier sleeve 552 is suitably formed of a resiliently flexible material to allow transverse expansion of the barrier sleeve 552 upon insertion of the foodstuff container into the warming compartment 511. In one suitable embodiment, the barrier sleeve 552 is also suitably formed of a relatively thermally insulating material. For example, in one suitable embodiment, the barrier sleeve 552 is constructed of silicone. It is understood, however, that the barrier sleeve 552 may be constructed of other suitable resiliently flexible materials without departing from the scope of this disclosure. It is also understood that the barrier sleeve 552 may be constructed of a material that is not thermally insulating and remain within the scope of this disclosure.

In the illustrated embodiment, the foodstuff container support base 559 circumscribes the lower end 557 of the barrier wall 553. The foodstuff container support base 559 is supported by and rests evenly on struts 120 of the first housing base 117. An opening 573 in the foodstuff container support base 559 is aligned with the conduit 123 to allow fluid communication between the reservoir 125 and the warming compartment 511 via the opening 573. The support base 559 includes a shelf support 558 circumscribing the lower end 557 of the barrier wall 553 and a plurality of support struts 560 attached on top of the shelf support 558 and extending radially inward from the barrier wall 553 towards the opening 573. Support struts 560 are configured to support the foodstuff container B within the barrier member 551 such that, during the warming operation, the warming liquid (not shown) may flow freely between the shelf support 558 and the support struts 560 without being resisted by the foodstuff container B. It is understood that in alternative embodiments, the support base 559 may not be necessary to support foodstuff container B. For example, in some embodiments, foodstuff container B may be in contact with and supported by the first housing base 117.

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above without departing from the scope of the disclosure, it is intended that all matter contained in the above description and shown in the accompanying drawings shall be interpreted as illustrative and not in a limiting sense.

What is claimed is:

1. A warming apparatus for warming contents of a foodstuff container, the warming apparatus comprising:
   an enclosure defining an interior space for receiving the foodstuff container and a reservoir separate from the interior space for receiving a warming liquid;
   a heating element disposed within the enclosure for warming the warming liquid within the reservoir; and
   a conduit configured to extend between the interior space and the reservoir so that the reservoir is in fluid communication with the interior space,
   wherein the conduit comprises a distal end positionable within the reservoir, the distal end extending a sufficient distance within the reservoir such that the distal end of the conduit is positioned below a surface of the warming liquid when the warming apparatus is in an operation mode and warming liquid is present in the reservoir, and
   wherein the heating element is adapted to move the warming liquid from the reservoir through the conduit into the interior space as the warming liquid within the reservoir is warmed.

2. The warming apparatus of claim 1 wherein the conduit is centrally located within the warming apparatus.

3. The warming apparatus of claim 1 wherein the heating element comprises a heat plate.

4. The warming apparatus of claim 3 wherein the enclosure comprises a bottom surface, the heat plate being located within the bottom surface.

5. The warming apparatus of claim 1 wherein the warming apparatus is free of a mechanical pump.

6. The warming apparatus of claim 1, wherein activation of the heating element is configured to increase an air pressure within an air pocket in the reservoir to move the warming liquid from the reservoir through the conduit into the interior space.

7. The warming apparatus of claim 1, wherein the enclosure comprises:
- a first housing having a peripheral sidewall defining the interior space for receiving the foodstuff container, the first housing having an open upper end and a base located opposite the open upper end; and
- a second housing defining the reservoir for receiving the warming liquid,
- wherein the heating element is disposed within the second housing, and
- wherein the conduit extends between the first housing and the second housing so that the reservoir defined by the second housing is in fluid communication with the interior space of the first housing.

8. The warming apparatus of claim 7, wherein the first housing is selectively attachable and detachable to the second housing.

9. The warming apparatus of claim 8, wherein the second housing includes an inner circumference and a coupling surface extending around the inner circumference, and
- wherein the first housing is adapted to sealingly engage the second housing at the coupling surface.

10. The warming apparatus of claim 9 wherein the first housing further comprises a sealing mechanism adapted to engage the coupling surface of the second housing.

11. The warming apparatus of claim 7, wherein the heating element comprises a heat plate, and wherein the second housing comprises a bottom surface, the heat plate being located within the bottom surface.

12. A warming apparatus for warming contents of a foodstuff container, the warming apparatus comprising:
- a first housing having a peripheral sidewall defining an interior space for receiving the foodstuff container, the first housing having an open upper end and a base located opposite the open upper end;
- a second housing defining a reservoir for receiving a warming liquid;
- a heating element disposed within the second housing for warming the warming liquid; and
- a conduit configured to extend between the first housing and the second housing so that the reservoir defined by the second housing is in fluid communication with the interior space of the first housing,
- wherein the conduit comprises a distal end positionable within the reservoir defined by the second housing, the distal end extending a sufficient distance within the reservoir such that the distal end of the conduit is positioned below a surface of the warming liquid when the warming apparatus is in an operation mode and warming liquid is present in the reservoir,
- wherein the heating element is adapted to move the warming liquid from the reservoir defined by the second housing through the conduit into the interior space of the first housing as the warming liquid within the reservoir is warmed.

13. The warming apparatus of claim 12 wherein the conduit is centrally located within the warming apparatus.

14. The warming apparatus of claim 12 wherein the first housing is selectively attachable and detachable to the second housing.

15. The warming apparatus of claim 14 wherein the second housing includes an inner circumference and a coupling surface extending around the inner circumference, and
- wherein the first housing is adapted to sealingly engage the second housing at the coupling surface.

16. The warming apparatus of claim 15 wherein the first housing further comprises a sealing mechanism adapted to engage the coupling surface of the second housing.

17. The warming apparatus of claim 12 wherein the heating element comprises a heat plate.

18. The warming apparatus of claim 17 wherein the second housing comprises a bottom surface, the heat plate being located within the bottom surface.

19. The warming apparatus of claim 12 wherein the warming apparatus is free of a mechanical pump.

20. The warming apparatus of claim 12, wherein activation of the heating element is configured to increase an air pressure within an air pocket in the reservoir to move the warming liquid from the reservoir into the interior space of the first housing.

* * * * *